United States Patent
Ulrey et al.

(10) Patent No.: US 10,508,612 B2
(45) Date of Patent: Dec. 17, 2019

(54) SYSTEM AND METHODS FOR OPERATING FUEL SYSTEM RESPONSIVE TO INFERRED FUEL TEMPERATURE

(71) Applicant: Ford Global Technologies, LLC, Dearborn, MI (US)

(72) Inventors: Joseph Ulrey, St. Joseph, MI (US); Ross Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 97 days.

(21) Appl. No.: 15/934,471

(22) Filed: Mar. 23, 2018

(65) Prior Publication Data
US 2019/0293017 A1    Sep. 26, 2019

(51) Int. Cl.
| F02D 41/30 | (2006.01) |
| F02D 19/06 | (2006.01) |
| F02M 65/00 | (2006.01) |
| F02D 41/38 | (2006.01) |
| F02M 63/02 | (2006.01) |
| F02D 19/08 | (2006.01) |

(52) U.S. Cl.
CPC ..... *F02D 41/3082* (2013.01); *F02D 19/0684* (2013.01); *F02D 19/0689* (2013.01); *F02D 19/0692* (2013.01); *F02D 41/3845* (2013.01); *F02M 63/0285* (2013.01); *F02M 65/00* (2013.01); *F02D 19/084* (2013.01); *F02D 41/3872* (2013.01); *F02D 2200/0602* (2013.01); *F02D 2200/0606* (2013.01); *F02D 2200/0611* (2013.01)

(58) Field of Classification Search
CPC ............ F02D 19/0689; F02D 41/3082; F02D 41/3845; F02D 2200/0602; F02D 2200/0608
See application file for complete search history.

(56) References Cited

U.S. PATENT DOCUMENTS

| 8,365,585 | B2 | 2/2013 | Barra et al. |
| 9,157,389 | B2 | 10/2015 | Nonoyama et al. |
| 9,453,474 | B2 | 9/2016 | Kramer et al. |
| 10,161,348 | B1 * | 12/2018 | Shaw ................. F02D 41/3082 |
| 2007/0170814 | A1 | 7/2007 | Sykes et al. |
| 2008/0072880 | A1 * | 3/2008 | Wachtendorf ...... F02D 41/2464 123/495 |
| 2014/0251269 | A1 * | 9/2014 | Hattar ...................... F02D 1/02 123/357 |
| 2016/0025030 | A1 | 1/2016 | Ulrey et al. |

FOREIGN PATENT DOCUMENTS

| DE | 10 2014 214 284 | * | 1/2016 | ............ F02M 37/08 |
| WO | 2017157750 A1 | | 9/2017 | |

* cited by examiner

*Primary Examiner* — Erick R Solis
(74) *Attorney, Agent, or Firm* — Geoffrey Brumbaugh; McCoy Russell LLP

(57) ABSTRACT

Methods and systems are provided for an engine to infer fuel temperature from a measured rate of change in a pressure of a fuel passage between a low pressure fuel pump and a high pressure fuel pump during certain operating conditions, including when the low pressure fuel pump is switched off. The operation of the low pressure fuel pump may be adjusted responsively to a change in the inferred fuel temperature.

20 Claims, 10 Drawing Sheets

SYSTEM AND METHODS FOR OPERATING FUEL SYSTEM RESPONSIVE TO INFERRED FUEL TEMPERATURE

FIELD

The present application relates generally to control schemes for a lift fuel pump of an internal combustion engine based on fuel temperature inferred from a rate of pressure change in a fuel passage.

SUMMARY/BACKGROUND

Some vehicle engine systems utilizing direct in-cylinder injection of fuel include a fuel delivery system that has multiple fuel pumps for providing suitable fuel pressure to fuel injectors. This type of fuel system, Gasoline Direct Injection (GDI), is used to increase the power efficiency and range over which the fuel can be delivered to the cylinder. GDI fuel injectors may require high pressure fuel for injection to create enhanced atomization for more efficient combustion. As one example, a GDI system can utilize an electrically driven lower pressure pump (e.g., a fuel lift pump) and a mechanically driven higher pressure pump (e.g., a direct injection pump) arranged respectively in series between the fuel tank and the fuel injectors along a fuel passage. In many GDI applications the lift fuel pump initially pressurizes fuel from the fuel tank to a fuel passage coupling the lift fuel pump and direct injection fuel pump, and the high-pressure or direct injection fuel pump may be used to further increase the pressure of fuel delivered to the fuel injectors. GDI fuel systems typically rely on an estimate of the inlet fuel temperature in order to set a GDI pump inlet pressure. If the estimated fuel temperature is inaccurate, the GDI pump inlet pressure can fall below a fuel vapor pressure, reducing engine performance and efficiency and potentially degrading DI pump durability. On the other hand, compensating for an unreliable fuel temperature by operating the GDI pump at excessively high pressures can increase power consumption and decrease fuel economy.

In one example, shown by Barra et al. in U.S. Pat. No. 8,365,585, a fuel temperature in a common rail injection system is estimated based on a fuel temperature measurement with a temperature sensor positioned in a first fuel line. The common rail injection system temperature is estimated utilizing a complex multi-functional model requiring measurements of engine cooling water temperature, inlet air temperature, vehicle driving velocity, fuel flow speed in the common rail, and fuel pressure in the common rail.

However, the inventors herein have identified potential issues with the approach of Barra et al. First, Barra's model introduces many sources of measurement error because it relies on measurement of several parameters. Furthermore, the model is constructed from at least eight empirical functions, requiring estimation of a multitude of experimental parameters, each of which introduces its own inherent uncertainty into the model. Accordingly, Barra's model may be unreliable and inaccurate because of the cumulative measurement error and inherent uncertainties in the empirical parameters, in particular, when the engine operation spans a wide range of operating conditions and empirical models tend to break down. Further still, in response to these types of conventional fuel temperature estimation models, which exhibit substantial inaccuracies, estimates of fuel temperatures are conservatively higher than actual fuel temperatures. Higher fuel temperature estimates result in higher fuel injection pressures so as to maintain engine performance, albeit sacrificing fuel economy.

In one example, the above issues may be at least partially addressed by a method, comprising, adjusting operation of a low-pressure fuel pump based on a fuel temperature indicated from a rate of change in a pressure of a fuel passage between the low-pressure fuel pump and a high-pressure fuel pump during a first condition, including when the low pressure fuel pump is switched off. In this way, a change in temperature of a volume of fuel may be computed from a measured pressure change in the volume of fuel that is directly related to the volume of fuel and any fuel volume gain or loss.

In this way, the technical effect of determining a fuel temperature accurately and reliably from a rate of change in the fuel pressure can be achieved. Furthermore, a fuel temperature model based on a measured fuel pressure and fuel volume may be constructed with greater accuracy relative to conventional models. Furthermore, the methods and systems described herein can determine the fuel temperature while reducing a reliance on other measured parameters. Further still, more accurately and reliably determining the fuel temperature can enable operation of the fuel system at lower fuel injection pressures, thereby reducing engine fuel consumption.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
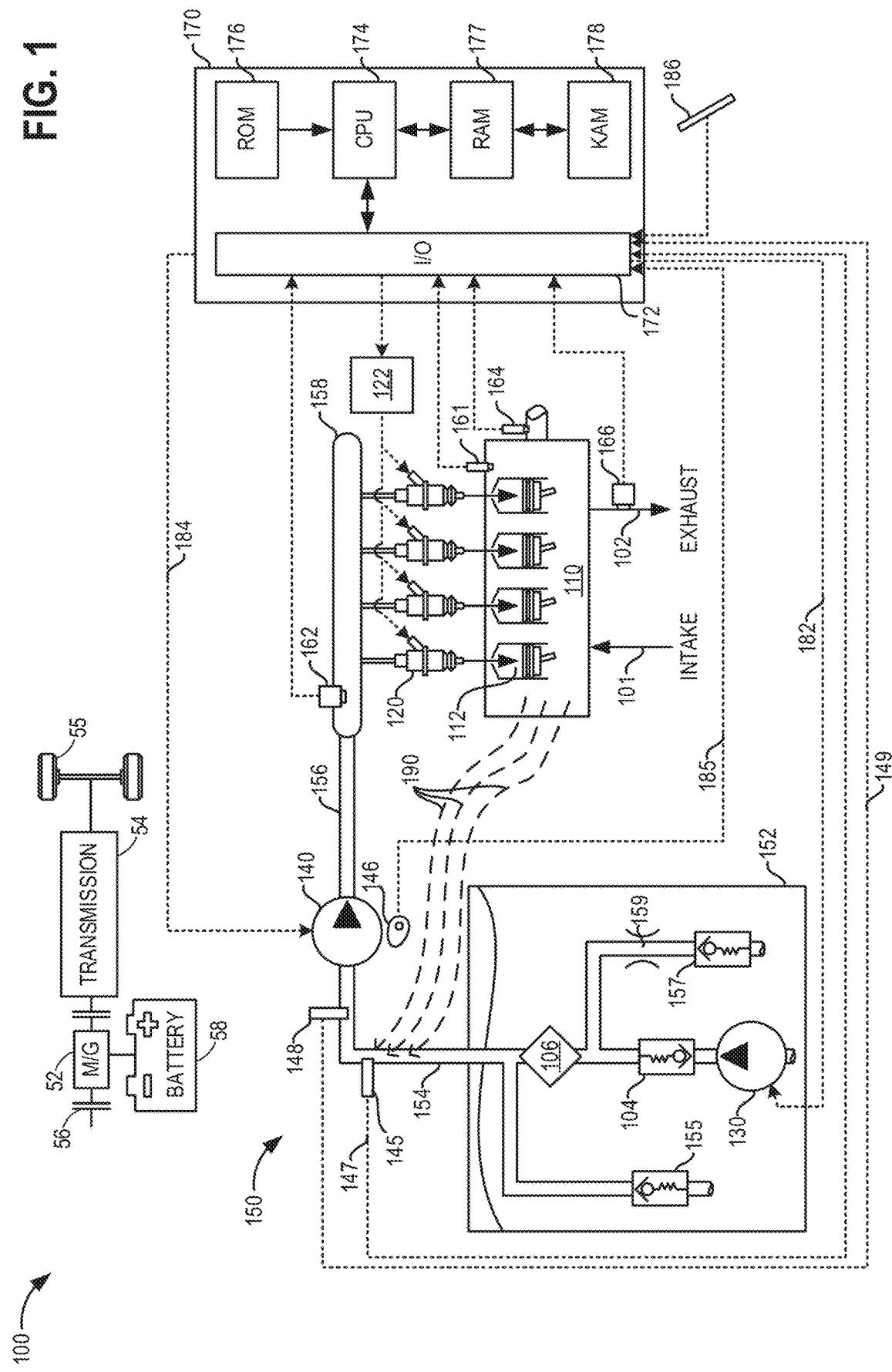
FIG. 1 shows a schematic diagram of vehicle system including an example fuel system coupled to an engine.
Figure 2:
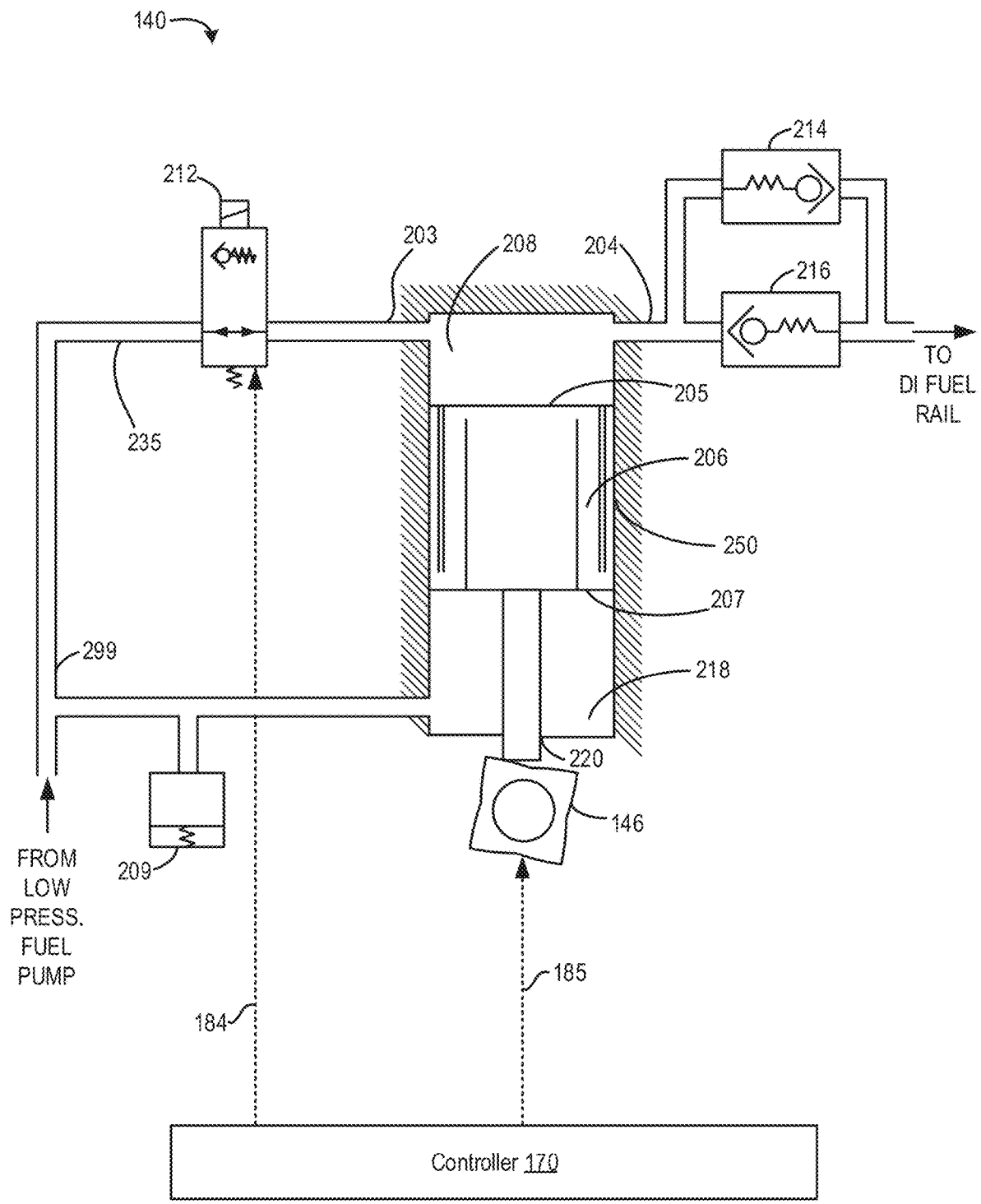
FIG. 2 shows a direct injection fuel pump and related components included in the fuel system of FIG. 1.
Figure 3:
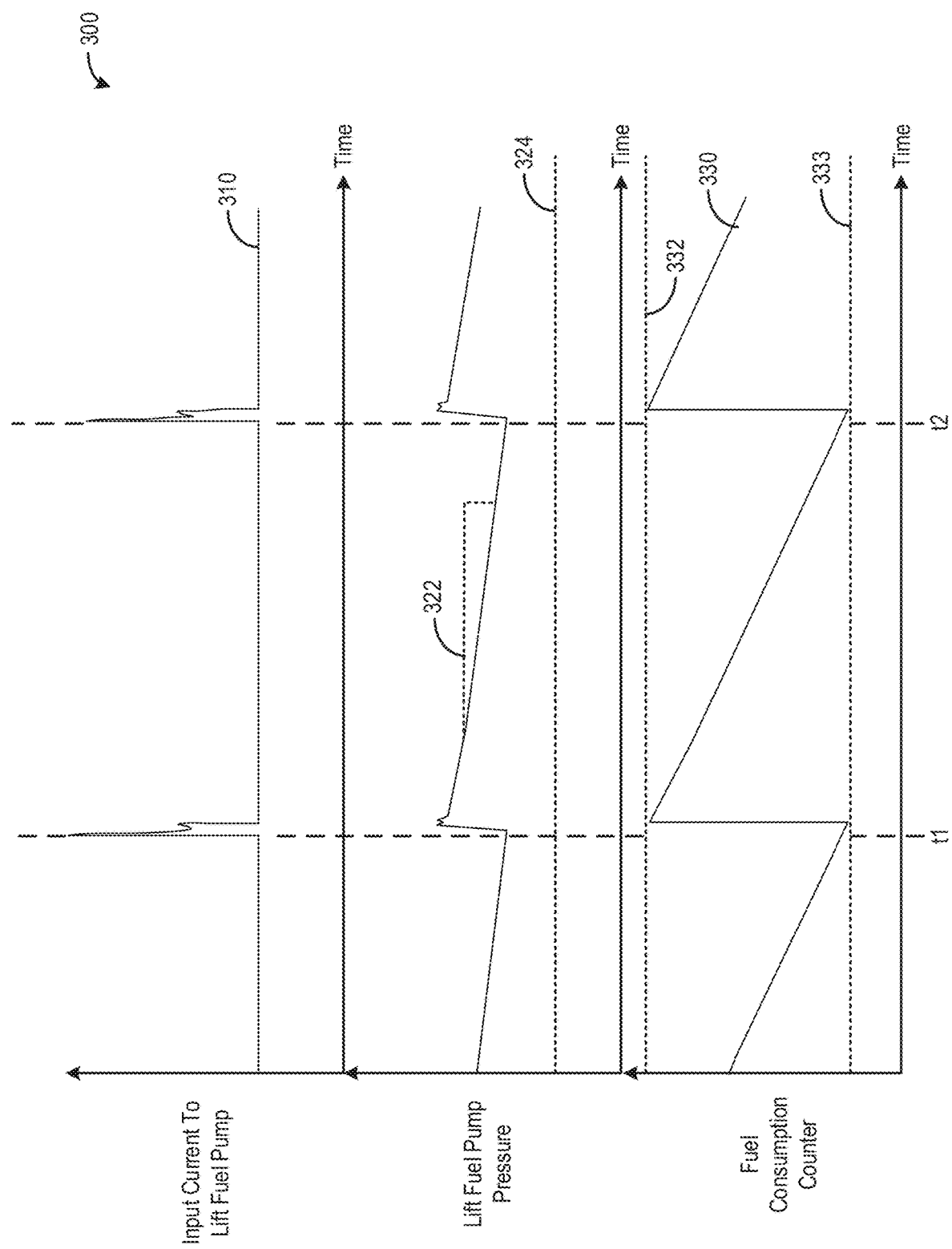
FIG. 3 shows an example pulsed energy mode for a lift fuel pump.
Figure 5:
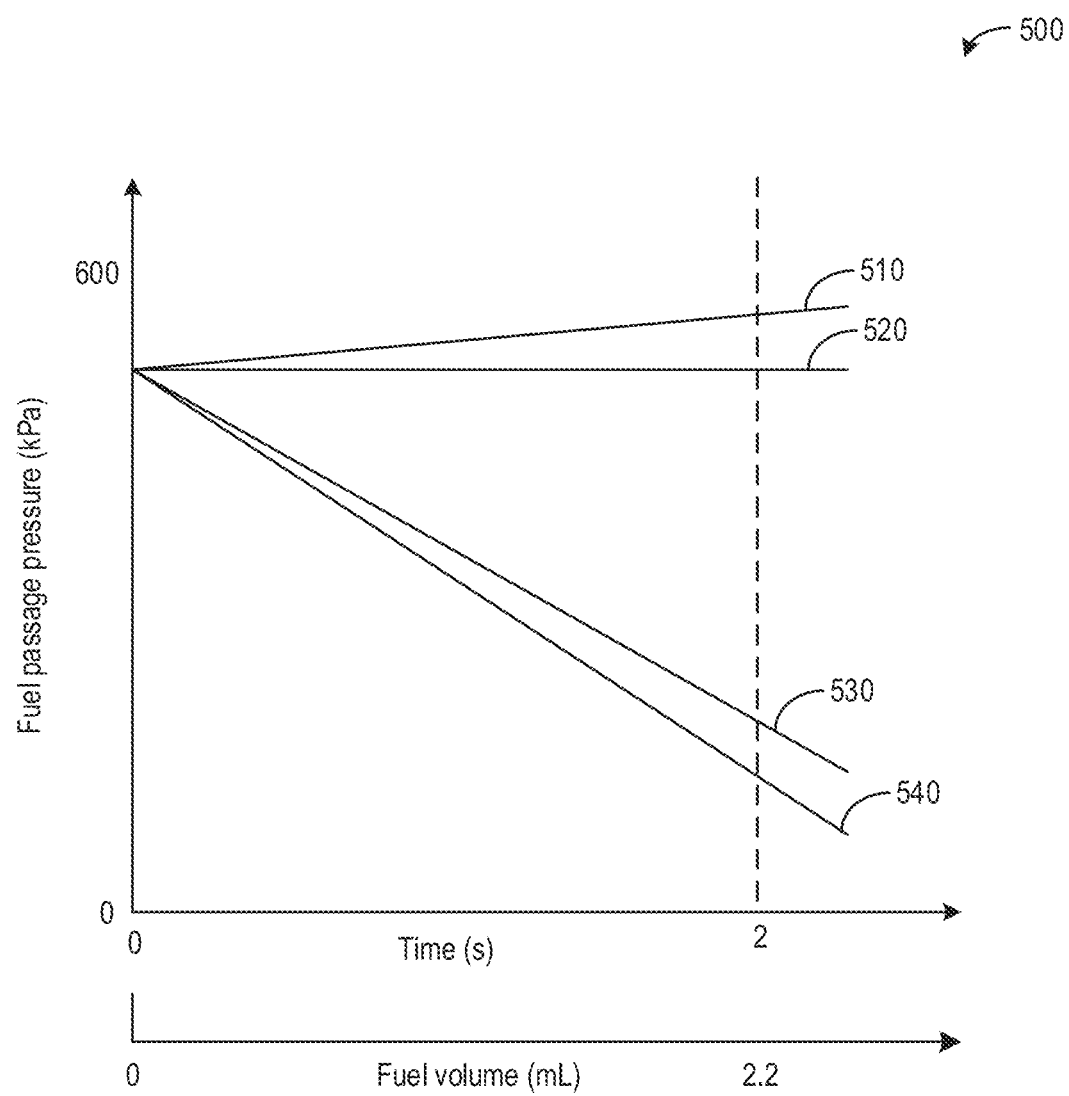
FIG. 5 shows a plot of fuel passage pressure.
Figure 6:
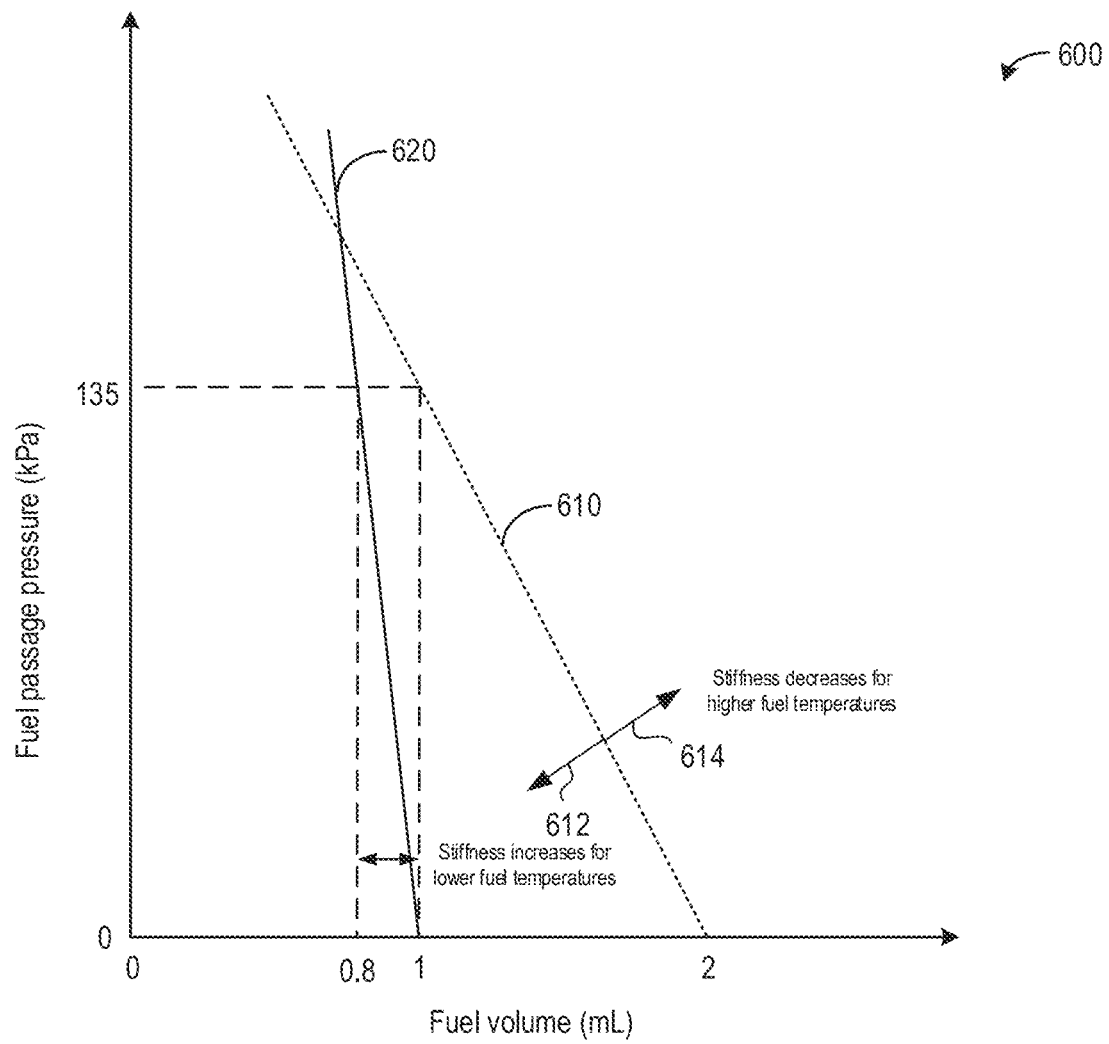
FIG. 6 shows a plot illustrating a fuel passage check valve diagnostic based on fuel passage pressure rate of change.
Figure 7:
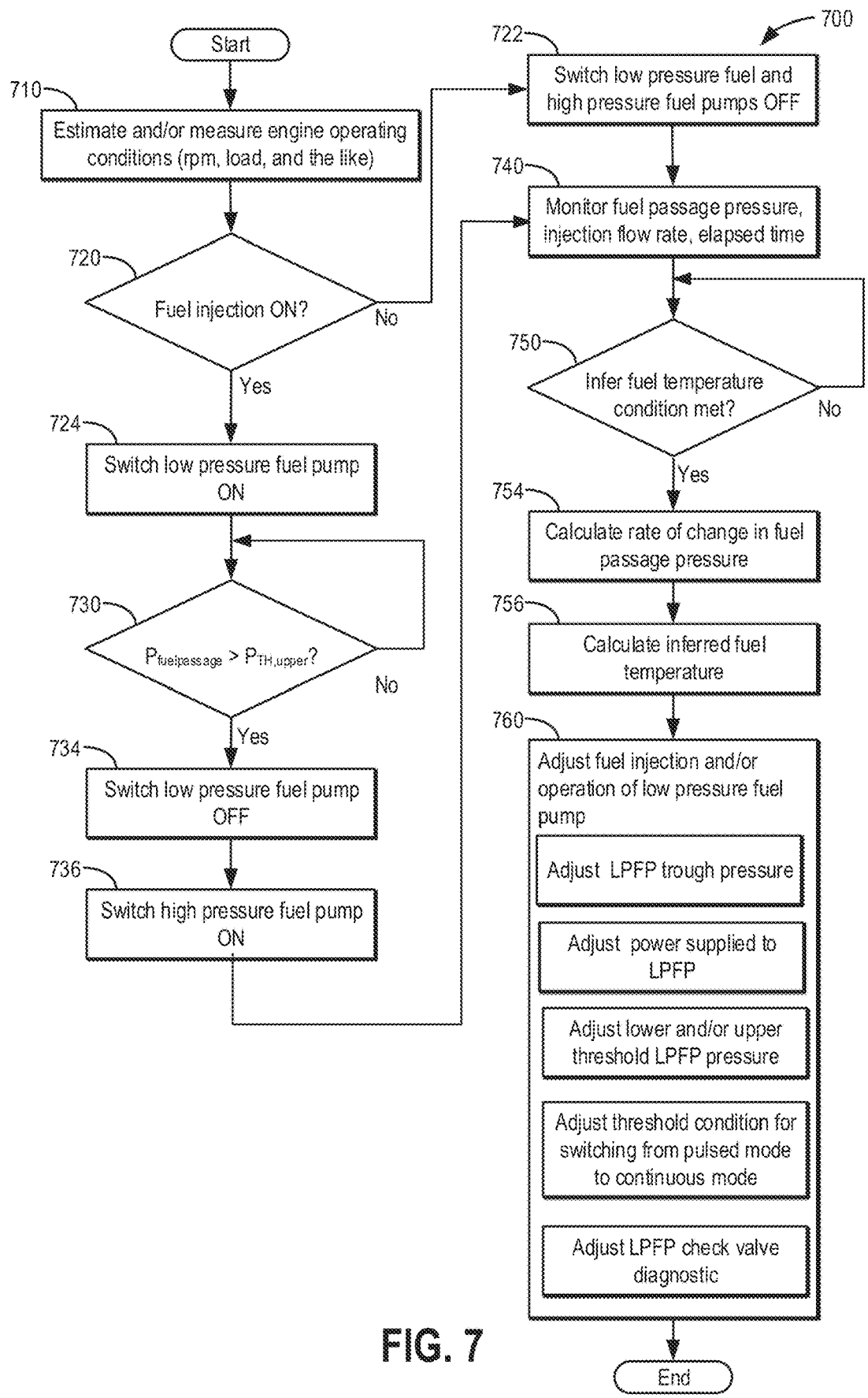
FIGS. 7 and 9 show flow charts of methods for inferring a fuel temperature and operating the fuel system of FIG. 2 responsive to the estimated fuel temperature.
Figure 8:
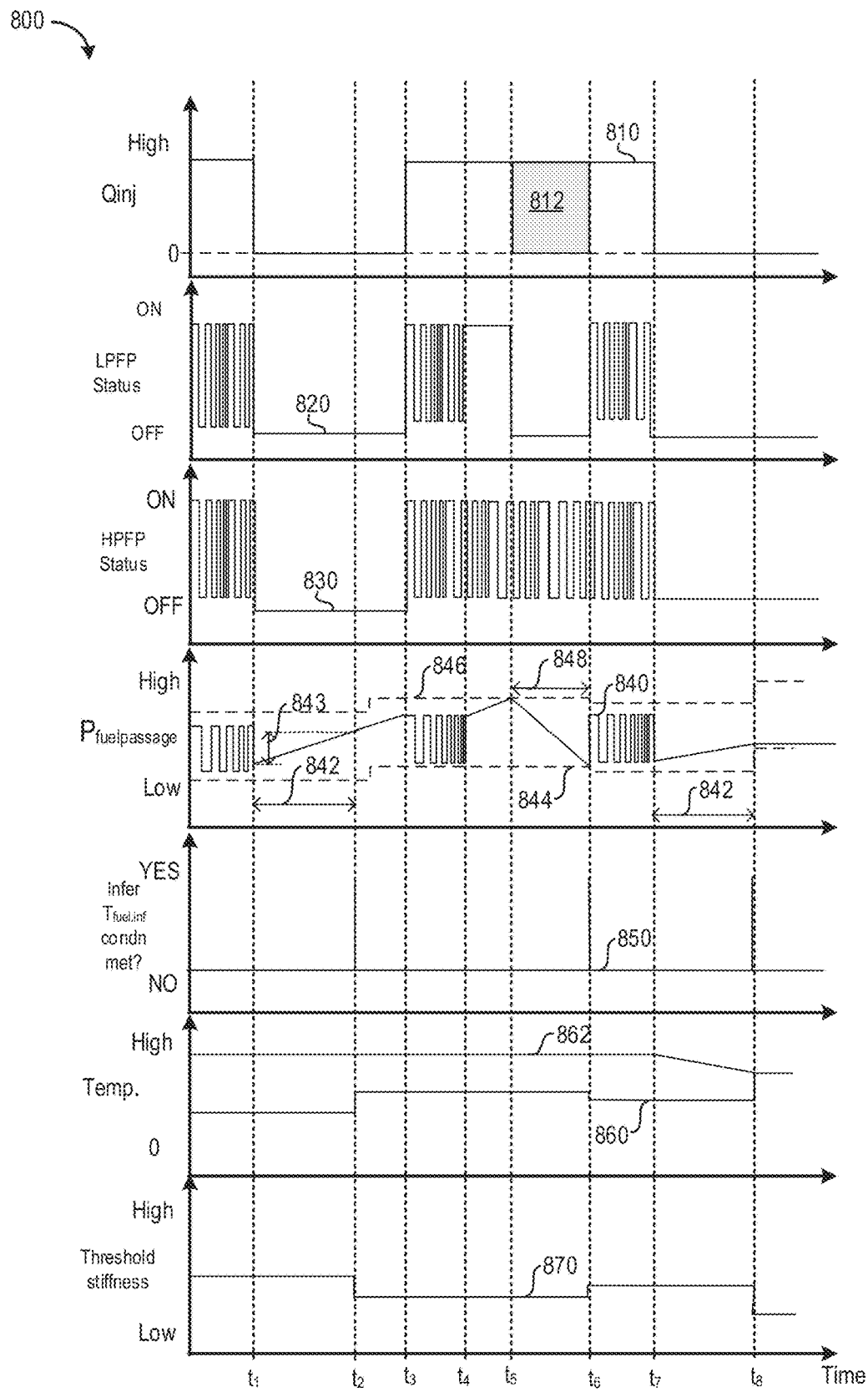
FIGS. 8 and 10 show timelines for operation of the fuel system of FIG. 1 responsive to the estimated fuel temperature according to the methods of FIGS. 7 and 9.
Figure 9:
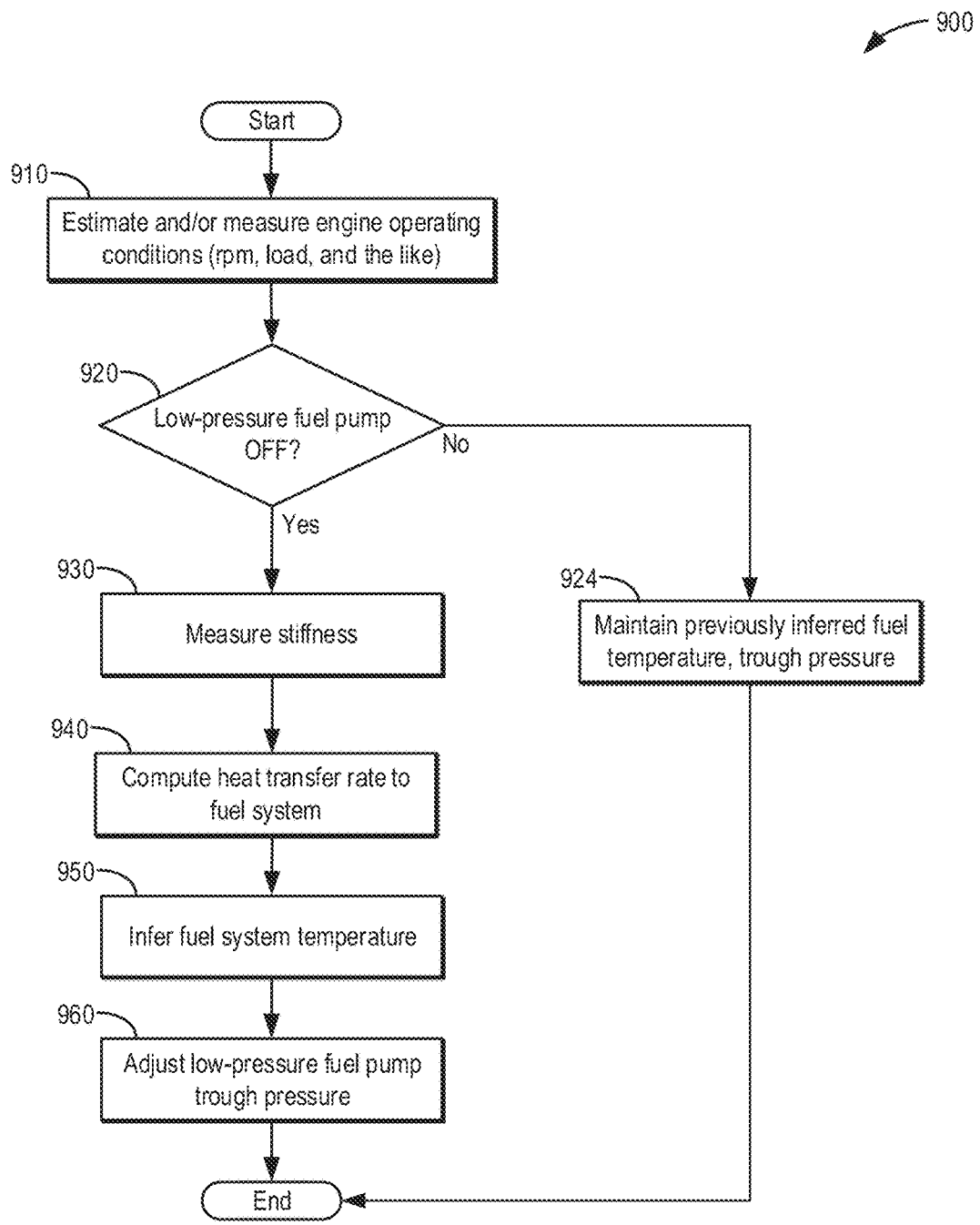
Figure 10:
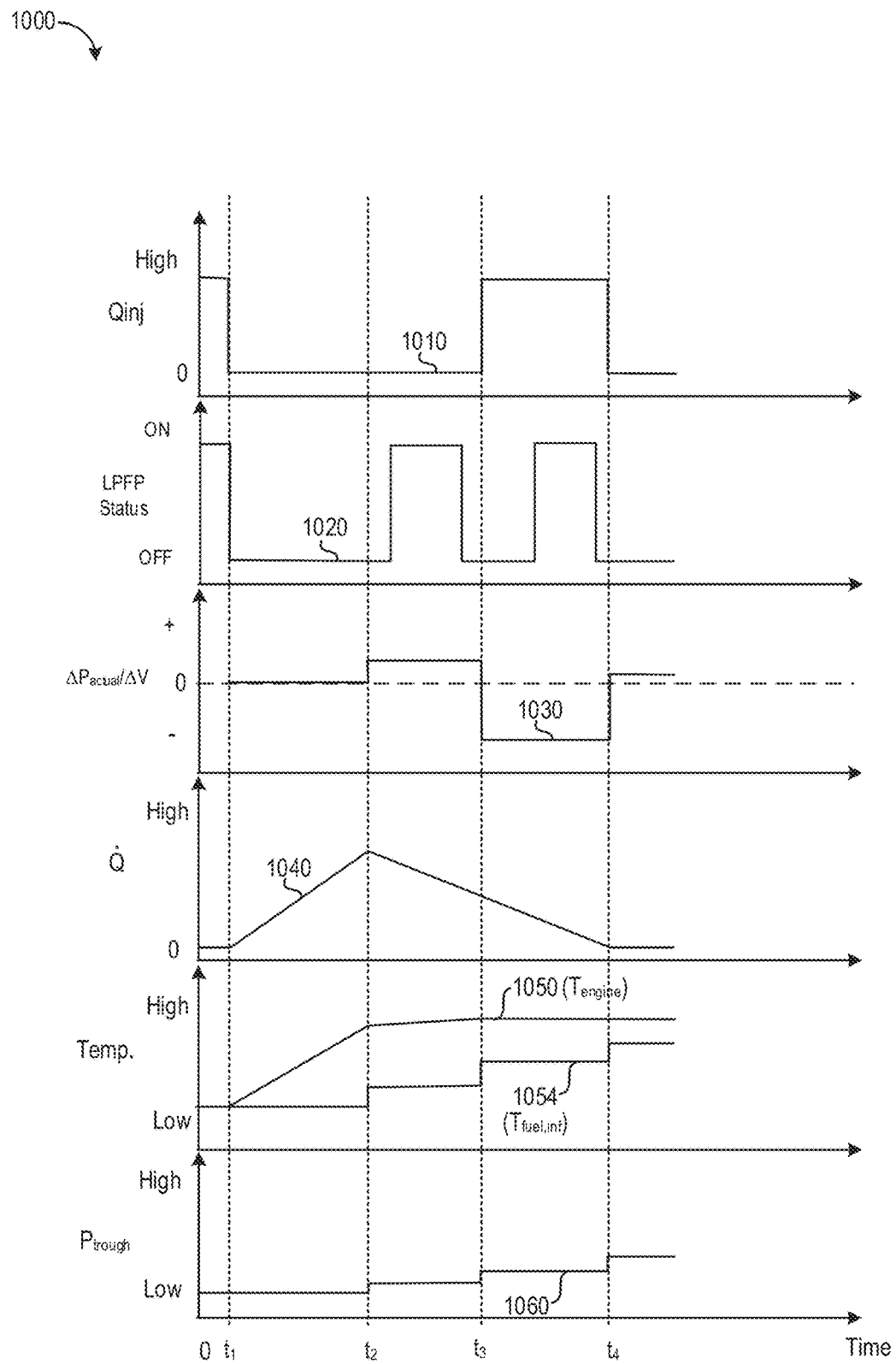

The following detailed description provides information regarding systems and methods for inferring a fuel system fuel temperature from a rate of change in a fuel pressure, and operation of the fuel system responsively thereto. A simplified schematic diagram of an example direct injection fuel system and engine is shown in FIG. 1 while FIG. 2 shows a detailed view of a direct injection fuel pump of FIG. 1 and associated components. FIG. 3 shows a graphical between two different control schemes for inputting current to the lift fuel pump, and operation of the fuel lift pump is exemplified in FIG. 4. FIGS. 5-6 illustrate fuel pressure for various engine and fuel system conditions, including how the fuel pressure stiffness may inform a fuel system check valve diagnostic. Methods of inferring a fuel temperature based on a fuel pressure rate of change, and operating the fuel system of FIG. 1 responsively thereto are shown in FIGS. 7 and 9. FIGS. 8 and 10 illustrate example timelines of operating the fuel system of FIG. 1 according to the methods represented in FIGS. 7 and 9.

Regarding terminology used throughout this detailed description, a higher-pressure fuel pump, high-pressure fuel pump, or direct injection fuel pump, that provides pressurized fuel to a direct injection fuel rail attached injectors may be abbreviated as a DI or HP pump. Similarly, a lower-pressure pump (compressing fuel at pressures generally lower than that of the DI pump), low-pressure fuel pump, or lift fuel pump, that provides pressurized fuel from a fuel tank to the DI pump may be abbreviated as an LP pump or LPFP. A solenoid spill valve, which may be electronically energized to allow check valve operation and de-energized to open (or vice versa), may also be referred to as a fuel volume regulator, magnetic solenoid valve, and a digital inlet valve, among other names.

FIG. 1 shows a vehicle system 100, including direct injection fuel system 150 coupled to an internal combustion engine 110, which may be configured as part of a propulsion system for a vehicle. The internal combustion engine 110 may comprise multiple combustion chambers or cylinders 112. Fuel can be provided directly to the cylinders 112 via in-cylinder direct injectors 120. As indicated schematically by arrows 101 and 102 in FIG. 1, the engine 110 can also receive intake air and exhaust products of the combusted fuel. For simplicity, the intake and exhaust systems are not shown in FIG. 1. The engine 110 may include a suitable type of engine including a gasoline or diesel engine. In other embodiments, the combusted fuel may include other individual fuels or a combination of different fuels. In one example, the engine may include a gasoline direct injection (GDI) engine and/or a port fuel injection (PFI) engine.

In some examples, the vehicle system 100 may include a hybrid vehicle with multiple sources of torque available to one or more vehicle wheels 55. In other examples, the vehicle system 100 may include a conventional vehicle with only a combustion engine 110, or an electric vehicle with only electric machine(s). In the example shown, the vehicle system 100 includes engine 110 and an electric machine 52. Electric machine 52 may be a motor or a motor/generator. A crankshaft (not shown) of engine 10 mechanically coupled to cam 146 and electric machine 52 may be connected via a transmission 54 to vehicle wheels 55 when one or more clutches 56 are engaged. In the depicted example, a first clutch 56 may be provided between the crankshaft and electric machine 52, and a second clutch 56 may be provided between electric machine 52 and transmission 54. Controller 170 may send a signal to an actuator of each clutch 56 to engage or disengage the clutch, so as to connect or disconnect the crankshaft from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle. Electric machine 52 receives electrical power from a traction battery 58 to provide torque to vehicle wheels 55. Electric machine 52 may also be operated as a generator to provide electrical power to charge battery 58, for example during a braking operation.

Fuel can be provided to the engine 110 via the injectors 120 by way of the direct injection fuel system indicated generally at 150. In this particular example, the fuel system 150 includes a fuel storage tank 152 for storing the fuel on-board the vehicle, a low-pressure fuel pump 130 (e.g., a fuel lift pump), a high-pressure fuel pump or direct injection (DI) pump 140, a fuel rail 158, and various fuel passages 154 and 156. In the example shown in FIG. 1, the low-pressure fuel passage 154 carries fuel from the low-pressure pump 130 to the DI pump 140, and the high-pressure fuel passage 156 carries fuel from the DI pump 140 to the fuel rail 158. Due to the locations of the fuel passages, passage 154 may be referred to as a low-pressure fuel passage while passage 156 may be referred to as a high-pressure fuel passage. As such, fuel in passage 156 may exhibit a higher pressure than fuel in passage 154. In some examples, fuel system 150 may include more than one fuel storage tank and additional passages, valves, and other devices for providing additional functionality to direct injection fuel system 150.

In the present example of FIG. 1, fuel rail 158 may distribute fuel to each of a plurality of direct fuel injectors 120. Each of the plurality of fuel injectors 120 may be positioned in a corresponding cylinder 112 of engine 110 such that during operation of fuel injectors 120 fuel is injected directly into each corresponding cylinder 112. Alternatively (or in addition), engine 110 may include fuel injectors positioned at or near the intake port of each cylinder such that during operation of the fuel injectors, fuel is injected with the charge air into the one or more intake ports of each cylinder. This configuration of injectors may be part of a port fuel injection system, which may be included in fuel system 150. In the illustrated embodiment, engine 110 includes four cylinders 112 that are only fueled via direct injection. However, it will be appreciated that the engine may include a different number of cylinders along with a combination of both port and direction fuel injection.

The low-pressure fuel pump 130 can be operated by a controller 170 to provide fuel to DI pump 140 via fuel low-pressure passage 154. The low-pressure fuel pump 130 can be configured as what may be referred to as a fuel lift pump. As one example, low-pressure fuel pump 130 can include an electric pump motor, whereby the pressure increase across the pump and/or the volumetric flow rate through the pump may be controlled by varying the electrical power provided to the pump motor, thereby increasing or decreasing the motor speed. For example, as the controller 170 reduces the electrical power that is provided to LP pump 130, the volumetric flow rate and/or pressure increase across the pump may be reduced. Alternatively, the volumetric flow rate and/or pressure increase across the pump may be increased by increasing the electrical power that is provided to the pump 130. As one example, the electrical power supplied to the low-pressure pump motor can be obtained from an alternator or other energy storage device on-board the vehicle (not shown), whereby the control system provided by controller 170 can control the electrical load that is used to power the low-pressure pump. Thus, by varying the voltage and/or current provided to the low-pressure fuel pump 130, as indicated at 182, the flow rate and pressure of the fuel provided to DI pump 140 and ultimately to the fuel rail 158 may be adjusted by the controller 170. The operation of the low-pressure fuel pump 130 will be discussed in further detail below with reference to FIGS. 3-4 and 7-8.

Low-pressure fuel pump 130 may be fluidly coupled to check valve 104 which may facilitate fuel delivery and maintain fuel passage pressure. Filter 106 may be fluidly coupled to outlet check valve 104 via low-pressure passage 154. Filter 106 may remove small impurities that may be contained in the fuel that could potentially damage fuel handling components. With check valve 104 upstream of the filter 106, the compliance of low-pressure passage 154 may be increased since the filter may be physically large in volume. Here, compliance refers to a change in volume of fuel pumped from low-pressure fuel passage 154 for a given drop in fuel passage pressure. Furthermore, pressure relief valve 155 includes a ball and spring mechanism that seats and seals at a specified pressure differential to relieve fuel and the fuel pressure at low-pressure fuel passage 154. An orifice check valve 157 may be placed in series with an orifice 159 to allow for air and/or fuel vapor to bleed out of the low-pressure fuel pump 130. As seen in FIG. 1, check valve 104 is oriented such that fuel backflow from DI pump 140 to the low-pressure pump 130 is substantially reduced (e.g., eliminated). In some embodiments, fuel system 150 may include a series of check valves fluidly coupled to low-pressure fuel pump 130 to further impede fuel from leaking back upstream of the valves. In this context, upstream flow refers to fuel flow traveling from fuel rail 158 towards low-pressure pump 130 while downstream flow refers to the nominal fuel flow direction from the low-pressure pump towards the fuel rail.

Next, fuel may be delivered from check valve 104 to high-pressure fuel pump (e.g., DI pump) 140. DI pump 140 may increase the pressure of fuel received from the check valve 104 from a first pressure level generated by low-pressure fuel pump 130 to a second pressure level higher than the first level. DI pump 140 may deliver high pressure fuel to fuel rail 158 via high-pressure fuel passage 156. Operation of DI pump 140 may be adjusted based on operating conditions of the vehicle in order to provide more efficient fuel system and engine operation. The components of the high-pressure DI pump 140 will be discussed in further detail below with reference to FIG. 2.

The DI pump 140 can be controlled by the controller 170 to provide fuel to the fuel rail 158 via the high-pressure fuel passage 156. As one non-limiting example, DI pump 140 may utilize a flow control valve, a solenoid actuated "spill valve" (SV), or fuel volume regulator (FVR) to enable the control system to vary the effective pump volume of each pump stroke. The spill valve, described in more detail in FIG. 2, may be separate or part of (e.g., integrally formed with) DI pump 140. The DI pump 140 may be mechanically driven by the engine 110 in contrast to the motor driven low-pressure fuel pump or fuel low-pressure fuel pump 130. A pump piston of the DI pump 140 can receive a mechanical input from the engine crank shaft or cam shaft via a cam 146. In this manner, DI pump 140 can be operated according to the principle of a cam-driven, single-cylinder pump. Furthermore, the angular position of cam 146 may be estimated (e.g., determined) by a sensor located near cam 146 communicating with controller 170 via connection 185. In particular, the sensor may measure an angle of cam 146 measured in degrees ranging from 0 to 360 degrees according to the circular motion of cam 146. While cam 146 is shown outside of DI pump 140 in FIG. 1, it is understood that cam 146 may be included in the system of DI pump 140.

As depicted in FIG. 1, a fuel passage pressure sensor 145 may be positioned in low-pressure passage 154 between the low-pressure fuel pump 130 and the DI pump 140. In that location, the fuel passage pressure sensor 145 may also be referred to as the lift pump pressure sensor or the low-pressure sensor. The fuel passage pressure sensor 145 may be connected to controller 170 via connection 147 and used to determine the fuel passage pressure, as well as a fuel passage capacitance and/or stiffness. Stiffness may refer to the change in pressure of the fuel for a given change in volume (e.g., reciprocal of capacitance). The fuel passage pressure measured by the fuel passage pressure sensor 145 may include the fuel pressure in fuel passage 154, as well as the fuel pressure in one more of passage 235, pump inlet 299, and accumulator 209. The fuel passage pressure sensor 145 may also aid the controller 170 in estimating a fuel temperature in the fuel system. As described in further detail below, the fuel temperature may be inferred from a rate of change in the fuel passage pressure. A fuel sensor 148 may be disposed downstream of the fuel low-pressure fuel pump 130. The fuel sensor 148 may measure fuel composition and may operate based on fuel capacitance, or the number of moles of a dielectric fluid within its sensing volume. For example, an amount of ethanol (e.g., liquid ethanol) and/or methanol in the fuel may be determined (e.g., when a fuel alcohol blend is utilized) based on the capacitance of the fuel. Furthermore an estimate of the fuel volatility may be determined based on the ethanol and/or methanol concentration in the fuel.

Further, in some examples, the DI pump 140 may be operated as the fuel sensor 148 to determine the level of fuel vaporization. For example, a piston-cylinder assembly of the DI pump 140 forms a fluid-filled capacitor. As such, the piston-cylinder assembly allows the DI pump 140 to be the capacitive element in the fuel composition sensor. In some examples, the piston-cylinder assembly of the DI pump 140 in the system, such that fuel vapor forms there first. In such an example, the DI pump 140 may be utilized as the sensor for detecting fuel vaporization, as fuel vaporization may occur at the piston-cylinder assembly before it occurs anywhere else in the system. Other fuel sensor configurations may be possible while pertaining to the scope of the present disclosure.

The pressure sensor itself may be used to indicate operation near the vapor pressure. The pressure signal has large pulsations where operated well above the fuel vapor pressure and reduced pressure pulsations when operated near vapor pressure. The objective is to operate minimally above the vapor pressure for pump function and durability while applying minimum pressure thus consuming minimum electrical lift pump power. Since vapor pressure depends strongly on fluid temperature (according to the August equation), it is useful to alter pressure based on fluid temperature (measured or inferred).

As shown in FIG. 1, the fuel rail 158 includes a fuel rail pressure sensor 162 for providing an indication of fuel rail pressure to the controller 170. An engine speed sensor 164 can be used to provide an indication of engine speed to the controller 170. The indication of engine speed can be used to identify the speed of DI pump 140, since the pump 140 is mechanically driven by the engine 110, for example, via the crankshaft or camshaft. An exhaust gas sensor 166 can be used to provide an indication of exhaust gas composition to the controller 170. As one example, the gas sensor 166 may include a universal exhaust gas sensor (UEGO). The exhaust gas sensor 166 can be used as feedback by the controller 170 to adjust the amount of fuel that is delivered to the engine 110 via the injectors 120. In this way, the controller 170 can control the air/fuel ratio delivered to the engine to a prescribed set-point.

Furthermore, one or more engine temperature sensors 161 may be mounted at an engine block or at one or more engine cylinders, respectively, to provide an indication of engine block and/or cylinder head temperature (CHT) to the controller 170. The CHT and/or engine block temperature measured by temperature sensor 161 may aid in determining an amount of heat (indicated by dashed lines 190) transferred from the engine 110 to the fuel system 150. Heat 190 may be transferred from the engine to the fuel system during conditions where the engine temperature is higher than the fuel system temperature, and when a vehicle is non-isothermal such that the engine is non-isothermal relative to the fuel system. Furthermore, the dashed lines are drawn to show the heat 190 being transferred from the engine 110 to the low-pressure fuel passage 154 for illustrative purposes; in some examples, the heat 190 may be transferred from the engine to other components of the fuel system 150 such as high-pressure fuel passage 156, DI pump 140, fuel tank 152, and the like. The heat 190 transferred to the fuel system 150 may raise a fuel temperature of fuel system 150, resulting in a corresponding change in the fuel passage pressure. Measurement of the rate of change in the fuel passage pressure may then aid in inferring a fuel temperature of the fuel system, as described in further detail below.

Furthermore, controller 170 may receive other engine/exhaust parameter signals from other engine sensors such as engine coolant temperature, engine speed, throttle position, absolute manifold pressure, emission control device temperature, etc. Further still, controller 170 may provide feedback control based on signals received from fuel sensor 148, pressure sensor 162, and engine speed sensor 164, among others. For example, controller 170 may send signals to adjust a current level, current ramp rate, pulse width of a solenoid valve (SV) of DI pump 140, and the like via connection 184 to adjust operation of DI pump 140. Also, controller 170 may send signals to adjust a fuel pressure set-point of a fuel pressure regulator and/or a fuel injection amount and/or timing based on signals from fuel sensor 148, pressure sensor 162, engine speed sensor 164, and the like. Other sensors not shown in FIG. 1 may be positioned around engine 110 and fuel system 150.

The controller 170 can individually actuate each of the injectors 120 via a fuel injection driver 122. The controller 170, the driver 122, and other suitable engine system controllers can comprise a control system. While the driver 122 is shown external to the controller 170, in other examples, the controller 170 can include the driver 122 or the controller can be configured to provide the functionality of the driver 122. The controller 170, in this particular example, includes an electronic control unit comprising one or more of an input/output device 172, a central processing unit (CPU) 174, read-only memory (ROM) 176, random-access memory (RAM) 177, and keep-alive memory (KAM) 178. The ROM 176 can be programmed with computer readable data representing non-transitory instructions executable by the processor 174 for performing the methods described below as well as other variants that are anticipated but not specifically listed. For example, controller 170 may contain stored instructions for executing various control schemes of DI pump 140 and LP pump 130 based on several measured operating conditions from the aforementioned sensors.

As shown in FIG. 1, direct injection fuel system 150 may include an electronic returnless fuel system (ERFS). In an ERFS, a pressure sensor 162 may be mounted at the fuel rail 158 to measure the fuel rail pressure; however, the open loop scheme described herein relegates the pressure sensor 162 to diagnostic purposes only and thus inclusion of the pressure sensor is discretionary. The signal from the pressure sensor 162 may be fed back to the controller 170, which controls the driver 122, the driver 122 modulating the voltage to the DI pump 140 for supplying the correct pressure and fuel flow rate to the injectors.

Although not shown in FIG. 1, in other examples, direct injection fuel system 150 may include a return line whereby excess fuel from the engine is returned via a fuel pressure regulator to the fuel tank via a return line. The fuel pressure regulator may be coupled in-line with the return line to regulate fuel delivered to fuel rail 158 at a set-point pressure. To regulate the fuel pressure at the set-point, the fuel pressure regulator may return excess fuel to fuel tank 152 via the return line upon fuel rail pressure reaching the set-point. It will be appreciated that operation of the fuel pressure regulator may be adjusted to change the fuel pressure set-point to accommodate operating conditions.

FIG. 2 shows DI pump 140 of FIG. 1 in more detail. DI pump 140 intakes fuel from low-pressure passage 154 during an intake stroke and delivers the fuel to the engine via high-pressure passage 156 during a delivery stroke. DI pump 140 includes a compression chamber inlet 203 in fluidic communication with a compression chamber 208 that may be supplied fuel via low pressure fuel pump 130 as shown in FIG. 1. The fuel may be pressurized upon its passage through direct injection fuel pump 140 and supplied to fuel rail 158 (and direct injectors 120) through pump outlet 204. In the depicted example, direct injection pump 140 may be a mechanically-driven displacement pump that includes a pump piston 206 and piston rod 220, a pump compression chamber 208, and a step-room 218. A passage that connects step-room 218 to a pump inlet 299 may include an accumulator 209, wherein the passage allows fuel from the step-room 218 to re-enter the low pressure line surrounding inlet 299. The accumulator 209 may absorb fuel refluxed from the pump chamber 208 back through valve 212. Piston 206 also includes a top 205 and a bottom 207. The step-room 218 and compression chamber 208 may include cavities positioned on opposing sides of the pump piston. In one example, engine controller 170 may be configured to drive the piston 206 in direct injection pump 140 by driving cam 146 via rotation of the engine crankshaft. In one example, cam 146 includes four lobes and completes one rotation for every two engine crankshaft rotations.

DI pump inlet 299 allows fuel to spill valve 212 located along passage 235. Spill valve 212 is in fluidic communication with the low-pressure fuel pump 130 and high-pressure fuel pump 140. Piston 206 reciprocates up and down within compression chamber 208 according to intake and delivery/compression strokes. DI pump 140 is in a delivery/compression stroke when piston 206 is traveling in a direction that reduces the volume of compression chamber 208. Alternatively, DI pump 140 is in an intake/suction stroke when piston 206 is traveling in a direction that increases the volume of compression chamber 208. A forward flow outlet check valve 216 may be coupled downstream of an outlet 204 of the compression chamber 208. Outlet check valve 216 opens to allow fuel to flow from the compression chamber outlet 204 into the fuel rail 158 only when a pressure at the outlet of direct injection fuel pump 140 (e.g., a compression chamber outlet pressure) is higher than the fuel rail pressure. Operation of DI pump 140 may increase the pressure of fuel in compression chamber 208 and upon reaching a pressure set-point, fuel may flow through outlet valve 216 to fuel rail 158. A pressure relief valve 214 may be placed such that the valve can mitigate the pressure in the DI fuel rail 158. Valve 214 may be biased to inhibit fuel from flowing downstream to fuel rail 158 but may allow fuel flow out of the DI fuel rail 158 toward pump outlet 204 when the fuel rail pressure is greater than a predetermined pressure (e.g., pressure setting of valve 214).

The solenoid spill valve (SV) 212 may be coupled to compression chamber inlet 203. As presented above, direct injection or high-pressure fuel pumps such as pump 140 may be piston pumps that are controlled to compress a fraction of their full displacement by varying closing timing of the solenoid spill valve. As such, a full range of pumping volume fractions may be provided to the direct injection fuel rail 158 and direct injectors 120 depending on when the spill valve 212 is energized and de-energized. In particular, controller 170 may send a pump signal that may be modulated to adjust the operating state (e.g., open or closed, check valve) of SV 212. Modulation of the pump signal may include adjusting a current level, current ramp rate, a pulse-width, a duty cycle, or another modulation parameter. Mentioned above, controller 170 may be configured to regulate fuel flow through spill valve 212 by energizing or de-energizing the solenoid (based on the solenoid valve configuration) in synchronism with the driving cam 146. Accordingly, solenoid spill valve 212 may be operated in two modes. In a first mode, solenoid spill valve 212 is not energized (deactivated or disabled) to an open position to allow fuel to travel upstream and downstream of a check valve contained in solenoid valve 212. During this mode, pumping of fuel into passage 156 cannot occur as fuel is pumped upstream through de-energized, open spill valve 212 instead of out of outlet check valve 216.

Alternatively, in the second mode, spill valve 212 is energized (activated) by controller 170 to a closed position such that fluidic communication across the valve is disrupted to inhibit the amount of fuel traveling upstream through the solenoid spill valve 212. In the second mode, spill valve 212 may act as a check valve which allows fuel to enter chamber 208 upon reaching the set pressure differential across valve 212 but substantially prevents fuel from flowing backward from chamber 208 into passage 235. Depending on the timing of the energizing and de-energizing of the spill valve 212, a given amount of pump displacement is used to push a given fuel volume into the fuel rail 158, thus allowing the spill valve 212 to function as a fuel volume regulator. As such, the timing of the solenoid valve 212 may control the effective pump displacement. Controller 170 of FIG. 1 is included in FIG. 2 for operating solenoid spill valve 212 via connection 184. Furthermore, connection 185 to measure the angular position of cam 146 is shown in FIG. 2. In some control schemes, angular position (e.g., timing) of cam 146 may be used to determine opening and closing timings of spill valve 212.

As such, solenoid spill valve 212 may be configured to regulate the mass (or volume) of fuel compressed into the direct injection fuel pump. In one example, controller 170 may adjust a closing timing of the solenoid spill valve to regulate the mass of fuel compressed. For example, a late spill valve 212 closing may reduce the amount of fuel mass ingested into the compression chamber 208. The solenoid spill valve opening and closing timings may be coordinated with respect to stroke timings of the direct injection fuel pump.

During conditions when direct injection fuel pump operation is not requested, controller 170 may activate and deactivate solenoid spill valve 212 to regulate fuel flow and pressure in compression chamber 208 to a pressure less than the fuel rail pressure during the compression (delivery) stroke. Control of the DI pump 140 in this way may be included in zero flow lubrication (ZFL) methods. During such ZFL operation, on the intake stroke the pressure in compression chamber 208 varies to a pressure near the pressure of the low-pressure fuel pump 130 and just below the fuel rail pressure. Subsequently, the pump pressure rises to a pressure near the fuel rail pressure at the end of the delivery (compression) stroke. If the compression chamber (pump) pressure remains below the fuel rail pressure, zero fuel flow results. When the compression chamber pressure is slightly below the fuel rail pressure, the ZFL operating point has been reached. In other words, the ZFL operating point is the highest compression chamber pressure that results in zero flow rate (e.g., substantially no fuel sent into fuel rail 158). Lubrication of the DI pump's piston-cylinder interface may occur when the pressure in compression chamber 208 exceeds the pressure in step-room 218. This difference in pressures may also contribute to pump lubrication when controller 170 deactivates solenoid spill valve 212. Deactivation of spill valve 212 may also reduce noise produced by valve 212. Said another way, even though the solenoid valve 212 is energized, if the outlet check valve 216 does not open, then the pump 140 may produce less noise than during other operating schemes. One result of this regulation method is that the fuel rail is regulated to a pressure depending on when solenoid spill valve is energized during the delivery stroke. Specifically, the fuel pressure in compression chamber 208 is regulated during the compression (delivery) stroke of direct injection fuel pump 140. Thus, during at least the compression stroke of direct injection fuel pump 140, lubrication is provided to the pump. When the DI pump enters a suction stroke, fuel pressure in the compression chamber may be reduced while still some level of lubrication may be provided as long as the pressure differential remains.

As an example, a zero flow lubrication strategy may be commanded when direct fuel injection is not desired (e.g., requested by the controller 170). When direct injection ceases, pressure in the fuel rail 158 is desired to remain at a near-constant level. As such, the spill valve 212 may be deactivated to the open position to allow fuel to freely enter and exit the pump compression chamber 208 so fuel is not pumped into the fuel rail 158. An always-deactivated spill valve corresponds to a 0% trapping volume, that is, 0 trapped volume or 0 displacement. As such, lubrication and cooling of the DI pump may be reduced while no fuel is being compressed, thereby leading to pump degradation. Therefore, according to ZFL methods, it may be beneficial to energize the spill valve 212 to pump a small amount of fuel when direct injection is not requested. As such, operation of the DI pump 140 may be adjusted to maintain a pressure at the outlet of the DI pump at or below the fuel rail pressure of the direct injection fuel rail, 158 thereby forcing fuel past the piston-bore interface of the DI pump. By maintaining the outlet pressure of the DI pump just below the fuel rail pressure and without allowing fuel to flow out of the outlet of the DI pump into the fuel rail, the DI pump may be kept lubricated, thereby reducing pump degradation. This general operation may be referred to as zero flow lubrication (ZFL).

It is noted here that DI pump 140 of FIG. 2 is presented as an illustrative, simplified example of one possible configuration for a DI pump. Components shown in FIG. 2 may be removed and/or changed while additional components not presently shown may be added to pump 140 while still maintaining the ability to deliver high-pressure fuel to a direct injection fuel rail. In particular, the zero flow lubrication methods described above may be implemented in various configurations of DI pump 140 without adversely affecting normal operation of the pump 140.

Various techniques may be used to control the energy input into the lift fuel pump 130 of FIG. 1, wherein the energy is provided to the pump via connection 182, as described previously. Due to unreliable and/or inaccurate fuel temperature estimation, some conventional techniques operate with excessively high lift pump input power level to mitigate vapor formation at the DI pump inlet. In other words, some techniques use excessive lift pump input power in order to provide robust and reliable operation of the lift pump over a wider range of engine conditions, wherein varying levels of lift pump operation (e.g., varying levels of input power) are desirable. The techniques that use excessive power may consume excess power resulting in additional fuel consumption. Alternatively, other techniques may reduce power input to the lift pump in order to lower fuel consumption; however, owing to unreliable and/or inaccurate estimation of the fuel temperature, these techniques may increase a risk of having a DI pump inlet pressure below the fuel vapor pressure during certain engine operation conditions, thereby worsening fuel injection control and engine performance.

Figure 4:
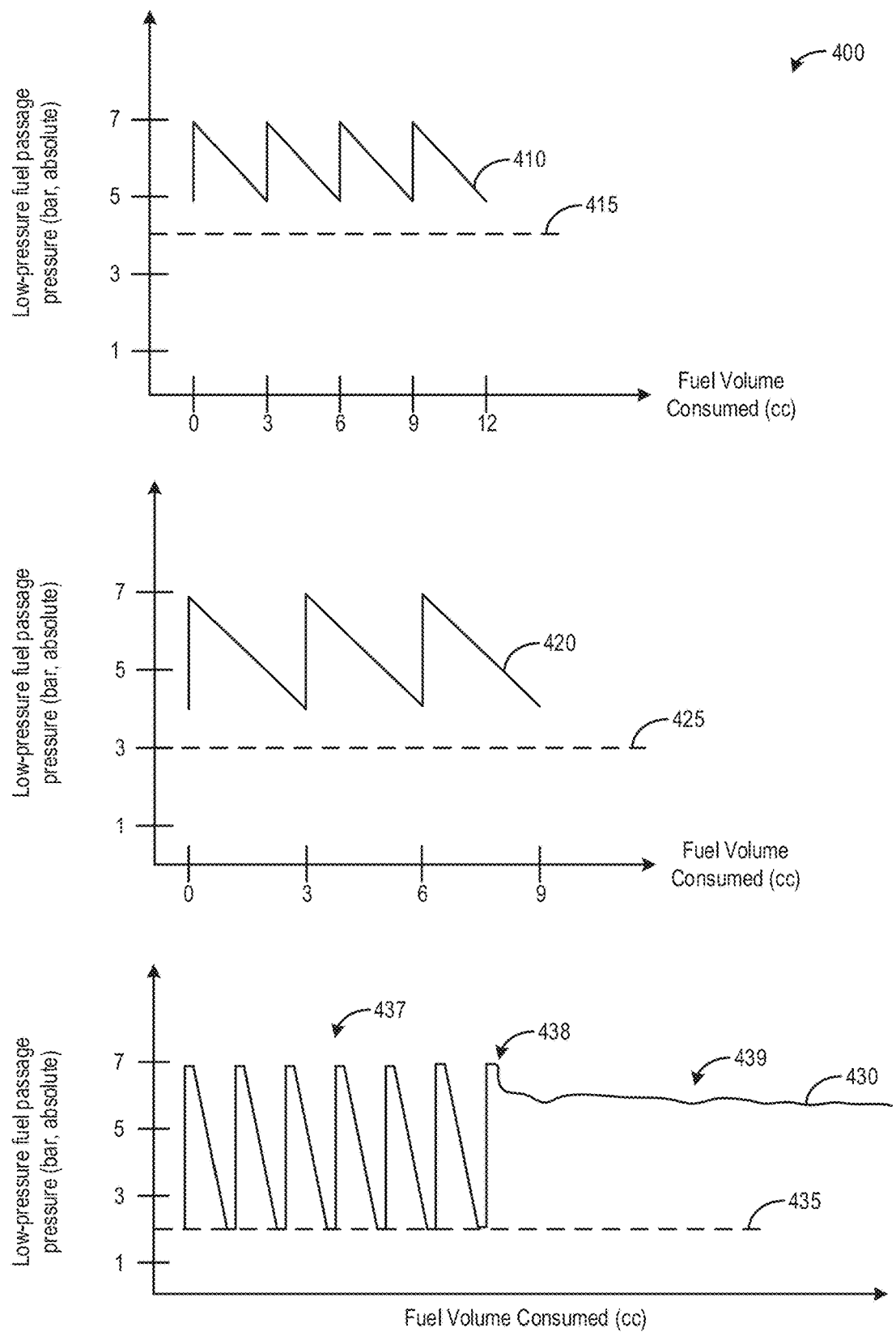
FIG. 4 shows several graphs depicting operation of the lift fuel pump during different situations.

Turning now to FIGS. 3-4, they illustrate various pulse and continuous modes of operating the low-pressure fuel pump. In the context of the present disclosure, continuous pump operation includes supplying a substantially constant current (e.g., power voltage, speed, or torque) to the lift pump. However, when fuel flow demand changes, then the current may be adjusted to a different level, wherein the different level is held substantially constant while the desired fuel flow is provided. Alternatively, pulsed pump operation includes supplying current to the lift pump during a threshold pulse duration. Within this context, the threshold pulse duration may include 0.3 seconds or another suitable quantity depending on the engine and fuel systems. In between pump pulsation events, substantially no current (e.g., none) is provided to the lift pump, thereby ceasing pump operation in between pulsation events.

FIG. 3 shows a graph 300 of an example pulsed current mode for a lift fuel pump. Plot 310 illustrates the level of current being sent to the lift fuel pump. In some embodiments of the pump, this may include sending the current from the controller to a pump electronics module (PEM) that directly operates the lift pump. Plot 320 shows the fuel pressure created by the lift pump as a result of the current input to drive the pump, also known as the pressure of the low-pressure fuel passage. The lift pump may be operated at or above a trough pressure 324, which may correspond to a low threshold pressure above which fuel vaporization in the fuel system is mitigated. The trough pressure 324 may be set by the controller 170 and may be adjusted responsive to the fuel temperature. For example, in response to an increase in fuel temperature (or inferred fuel temperature), the controller 170 may raise the trough pressure 324 to reduce a risk of fuel vaporization. Under certain operating conditions, the pressure rise due to the current pulse and pressure drop due to injection of a known volume of fuel may be known a priori and/or may be measured with the fuel passage pressure sensor 145. In some embodiments, the fuel passage pressure may be substantially the same as the fuel pressure at an inlet of the direct injection pump (with direct injection fuel systems). Lastly, plot 330 shows a level of fuel consumption, as indicated by a fuel consumption counter. The counter, or other method for determining fuel consumption, may be used as the basis to trigger lift pump pulsation events. Time is represented as the horizontal axis for all plots shown in FIG. 3. Times t1 and t2, as explained in further detail below, may also be referred to as current pulsation events.

Referring to FIG. 3, prior to time t1 pump input current may be maintained at a substantially constant level, such as 0 amps to conserve energy. As such, as fuel in the low-pressure fuel passage is pumped into the fuel rail (and then sent to the direct injectors and combusted by the engine), the pressure in the LP passage decreases. Related, during this time, the fuel consumption counter exhibits a decreasing amount of fuel present downstream of the lift pump and available for injection in case of a PFI fuel system and DI pump inlet pressure in the case of a DI fuel system. A threshold fuel level 332 can be seen in plot 330, wherein the threshold level is representative of the amount of consumed fuel at which a current pulsation event may be triggered (e.g., commanded or desired). Horizontal line 333 represents 0 cc of fuel, which may be the level reached by the counter when a pulsation event is triggered, and the lift pump is re-energized for a short pulse. In summary, lift pump is energized for a short duration when a threshold fuel volume 332 is pumped into the fuel rail (or alternatively a given fuel volume is injected into the engine).

At times t1 and t2, a pulsation of the fuel lift pump is triggered, as the fuel consumption counter of plot 330 decreases to 0 cc from the preset threshold 332. The fuel consumption counter of plot 330 begins decreasing (counting down) after the electrical power to the lift pump is turned off. In some examples, the triggering may involve sending a signal from the fuel consumption counter and associated sensors to controller 170 of FIG. 1, whereupon the controller sends an electrical signal (e.g., a current) to pulse the lift pump. As such, the input current to the lift fuel pump of plot 310 may increase shortly after threshold 332 is reached, or close to time t1. In response to the input current, the lift pump may operate in a pulse mode in order to provide fuel under pressure to the low-pressure fuel passage. The increase in the pressure in the LP fuel passage or lift fuel pump pressure, is seen in plot 320. After completion of a preset time duration, the input current to the lift pump may decrease back to substantially 0. The preset time duration may be a value such as 200 milliseconds in some examples. Also, the time duration may be calculated and recorded by a counter program coded into controller 170 or another suitable device. The preset time duration quantifies the length of the each pulsation event. The value of slope 322 may at least partially depend on the compliance of the low-pressure fuel passage 154 located in between the LP and DI pumps, as described with regard to FIG. 1. The compliance of the passage may maintain pressure on the fuel located inside the passage as the fuel is being pumped through the DI pump and consumed by the engine. In particular, the slope 322 (dP/dV) may represent a measure of the stiffness of the fuel system, which is the reciprocal of the compliance.

Between times t1 and t2, when substantially no current is sent to the lift pump, the lift pump pressure steadily decreases while fuel is sent through the DI pump and injected into the engine. Furthermore, the fuel consumption counter reactivates and begins measuring the volume of fuel consumed by the engine. Regarding FIG. 3, the data shown represents the case of constant fuel consumption and constant fuel rail pressure, for simplicity. As such, a steady, linear decrease can be seen in plot 330. As seen in the two pulsation events of times t1 and t2 of FIG. 3, fluctuations in the input current may occur as a normal result of noise present in the electrical system between the controller and its connected systems. Furthermore, as a result of the fluctuations in current, the lift fuel pump pressure may also fluctuate before steadily decreasing after the input current is shut off. It is noted that graph 300 is presented as an example visualization of the present lift pump pulsation control scheme. As such, other examples of similar pulsation control schemes may include different shapes of plots 310, and 320, and 330. For example, the time duration may be longer such that the lift pump pressure increases to a higher level than shown in FIG. 3.

The DI pump inlet pressure may be governed primarily by fuel temperature, whereby the DI pump may be operated at higher DI pump inlet pressures when a fuel temperature, including a DI inlet fuel temperature, is higher. In an example operating mode, a DI pump inlet pressure may be preselected. However, in other examples, varying the DI pump inlet pressure can aid in reducing fuel consumption, depending on the engine operating condition. The DI pump inlet pressure may be varied by choosing a different fuel volume between pulses and/or also choosing a different pulse duration. For example, the volume interval between pulses can be extended and the pulse duration could be slightly increased to lower the DI pump inlet pressure. Other control schemes such as a continuous lift pump mode may be implemented by the controller 170 by computing a variable target for the DI pump inlet pressure, while varying the lift pump fuel flow rate by actuating the pump speed based on feedback fuel passage pressure sensor measurements. In contrast, the pulsed mode operation of the lift pump allows the fuel passage pressure to vary but maintains the lift pump pressure above a threshold DI pump inlet pressure which may optionally be computed and variable.

FIG. 4 shows several graphs 400 depicting operation of the lift fuel pump during different conditions. Graph 410 shows operation of the lift fuel pump during a pulsed energy mode while graph 420 also shows normal operation but in a different way than that shown in 410. Graph 430, alternatively, shows operation of the lift fuel pump responsive to detection of a faulty check valve, wherein the lift pump may be commanded to pulse more frequently when triggered by detection of vapor and as compared to when triggered by a fuel volume counter. The horizontal axis for the three graphs is shown as fuel volume consumed (e.g., injected to the engine), measured in cubic centimeters, while the vertical axis for the three graphs is shown as pressure in the low-pressure fuel passage, measured in bar (absolute). In a PFI system, the engine fuel rate may correspond to the injection fuel rate; in a GDI system, the fuel rate may correspond to the DI pump fuel rate.

Each of the three graphs includes vertical sections connected with sloped lines. Plot 410 illustrates pulsed operation of the lift pump above a threshold pump pressure 415 near 4 bar, while plot 420 illustrates pulsed operation of the lift pump above a threshold pump pressure 425 of near 3 bar. In one example, the threshold pressure may correspond to a fuel vapor pressure for a given fuel temperature. Thus, threshold pump pressure 415 may represent a fuel vapor pressure at a higher temperature and threshold pump pressure 425 may represent a fuel vapor pressure at a lower temperature. In both cases, the lift pump is pulsed above the corresponding threshold pressure in response to injection of a threshold fuel volume (e.g., 3 cc) to the engine by the DI pump. Pulsing of the lift pump thus maintains a fuel passage pressure above a threshold pressure (and a fuel vapor pressure), while ensuring that a volume of fuel in the fuel passage is sustained to maintain the desired threshold volume of fuel injection rate. The fuel vapor pressure may be calculated based on a fuel temperature estimate and/or measurement.

Referring to graph 430, it illustrates operation of the lift pump, whereby vapor formation at the inlet of the DI pump or in the LP fuel passage is indicated. In response to the presence of fuel vapor in the low-pressure fuel passage 154, operation of the lift pump during pulsed region 437 includes the controller 170 sending current pulses to the LP pump to increase fuel pressure above the fuel vapor pressure 435. During the pulsed region 437, the intervals in between subsequent pulsation events may be shortened in graph 430 as compared to the intervals of graphs 410 and 420, and the duration of the energized pulses in pulsed region 437 may be longer than those of graphs 410 and 420, in order to maintain a fuel passage pressure above the fuel vapor pressure.

Upon completion of a mitigating condition such as a volume of fuel consumed, a time duration, and/or a number of pulsation events during pulsed region 437, operation of the LP pump may switch from the pulsed energy region to the continuous energy region 439, as indicated at transition 438. In another example, the condition may include determining that the vapor formation is caused by a faulty check valve 104, such as when the check valve 104 is stuck in the open position (as described in more detail with reference to FIG. 6). After transition 438, controller 170 may command directing a continuous current to the LP pump during the continuous energy mode 439. During the continuous energy region 439, the controller 170 may maintain operation of the lift pump pressure relatively higher and over a relatively narrower fuel pressure range as compared to the fuel pressure range of pulsed region 437. Maintaining a lift pump pressure at an elevated pressure of continuous region 439 may aid in reducing vapor formation by keeping the lift pump pressure well above the fuel vapor pressure, as well as compensate for fuel pumping deficiencies caused by a faulty check valve.

Turning now to FIG. 5, it illustrates a plot of fuel passage pressure, such as the low-pressure fuel passage pressure versus time and injected fuel volume, for various operating conditions. As discussed above, the stiffness corresponds to the slope of the fuel passage pressure relative to the fuel volume axis, in other words a change of rate in the fuel pressure relative to the fuel volume injected. Similarly, the change in rate of fuel pressure with time may be represented by a slope of the fuel passage pressure relative to the time axis. As discussed above with reference to FIG. 1, measurement of the rate of change in the fuel passage pressure may aid in inferring a fuel temperature of the fuel system. In particular, a change in fuel pressure may result from a change fuel temperature caused by the heat 190 transferred from the engine to the fuel system 150.

During operating conditions where check valve 104 is closed, (such as when the lift pump is switched off) while the DI pump is switched off, fuel may be trapped within the low-pressure fuel passage 154, such as, for example, during a decel fuel shut-off (DFSO) event. Furthermore, fuel may be trapped within the low-pressure fuel passage during engine auto stop, at key-off, and during hybrid electric vehicle (HEV) engine-off operation. Accordingly, the fuel system may experience an increase in pressure resulting from heat transferred thereto from the engine, as shown by trend line 510. Furthermore, the rate of change in pressure with time (dP/dt) maybe directly proportional to the heat transfer rate, $\dot{Q}$. Further still, heat transfer rate into the fuel system may be directly proportional to a temperature difference between the engine 110 and the fuel system temperature, as represented below by equation (1), $$\dot{Q}=C*\Delta T, \quad \text{Equation 1:}$$

where $\dot{Q}$ is the heat transfer rate (W), C is an empirical constant representing the heat capacity rate (W/° C.) of the fuel system, and $\Delta T$ is the temperature difference between the engine temperature and the fuel system temperature, $T_{engine}-T_{fuel}$. For the case of the trapped fuel within the low-pressure passage, the heat capacity rate, C, may correspond to a heat capacity rate of the low-pressure fuel passage and the fuel contained therein. $T_{engine}$ may correspond to a representative engine temperature such as a cylinder head temperature or other engine temperature external to the fuel system 150 and measured by engine temperature sensor 161 representative of where the heat is being transferred from, whereas $T_{fuel}$ may correspond to a fuel system temperature (e.g., temperature internal to the fuel system) representative of where the heat is being transferred to. In one example, $T_{fuel}$ may correspond to an fuel temperature at the inlet to the DI pump 140 (such as DI pump inlet 299 or fuel passage 235), or a fuel temperature in or at the DI pump 140. In some examples, $T_{engine}$ may correspond to the cylinder head temperature since a mounting surface of the DI pump may be positioned in close proximity to the cylinder head such that its temperature may be very near to the cylinder head temperature. The heat transfer rate, $\dot{Q}$, may be computed by equation (2), $$\dot{Q} = \rho s \dot{P} \left(\frac{1}{K}\right)\left(\frac{1}{\alpha v}\right), \quad \text{Equation 2}$$

where $\rho$ is the fuel density (g/mL), s is the specific heat capacity of the fuel $$\left(\frac{J}{g \cdot °C.}\right),$$

$\dot{P}$ is the rate of change in the fuel passage pressure (kPa/s), K is the stiffness of the low-pressure fuel passage (kPa/mL), and $\alpha v$ (1/° C.) is the fuel coefficient of thermal expansion. The stiffness, K, may be a predetermined quantity, or may be measured during operation of the engine by measuring the pressure drop corresponding to injecting or pumping out a given volume of fuel from the low-pressure fuel passage with the DI pump. In one example, the controller 170 may measure the stiffness of the fuel passage during operating conditions when the low-pressure fuel pump 130 is switched off. The pressure rise rate, $\dot{P}$, may be measured by the controller 170 by way of the fuel passage pressure sensor 145 while fuel is trapped in the low-pressure fuel passage between the lift pump and the DI pump. As an illustrative example for gasoline fuel, $\rho=0.75$ g/mL, $$s = 2.22 \frac{J}{g \cdot °C.},$$

$\alpha v=0.00095$ (1/° C.), and K=100 kPa/mL, the heat transfer rate from the engine into the low-pressure fuel passage may be calculated from equation (3) as, $$\dot{Q} = (0.75 \text{ g/mL})\left(2.22 \frac{J}{g \cdot °C.}\right)(10 \text{ kPa/s}) \quad \text{Equation 3}$$

$$\left(\frac{1}{100 \text{ kPa/mL}}\right)\left(\frac{1}{0.00095/°C.}\right) = \dot{P} * 17.5 \text{ W}$$

It follows that the fuel system temperature may be inferred from the measured rate of change in the fuel passage pressure, and the measured engine temperature, $T_{engine}$, from equation 1, $$T_{fuel} = T_{engine} - \frac{\dot{P} * 17.5 \text{ W}}{C.} \quad \text{Equation 4}$$

In one example, $\dot{P}$ may be measured as 10 kPa/s an empirical value of C for the low-pressure fuel passage may include 5 W/° C. Hence the fuel system temperature may be inferred or calculated as a function of the measured engine temperature according to equation (5), $$T_{fuel} = T_{engine} - \frac{175 \text{ W}}{5 \frac{W}{°C.}} = T_{engine} - 35° \text{ C.} \quad \text{Equation 5}$$

It follows from equation (4) then, for the case where the fuel system is isothermal relative to the engine such that $T_{fuel}=T_{engine}$, no rate of change in the fuel passage pressure is observed, as shown by trend line 520. In other words, there is no heat transfer from the engine raising the fuel passage pressure, and because the high-pressure fuel pump 140 is switched off (and the low-pressure fuel pump is switched off 130), there is no loss in fuel passage pressure due to fuel injection.

During operating conditions when fuel is being injected into the engine while a low-pressure fuel pump 130 is switched off, fuel temperature may also be inferred from the rate of change in the fuel passage pressure. While the low-pressure fuel pump 130 is off, the DI pump 140 may pump fuel from the low-pressure passage (in a pulsed or continuous mode) to the fuel rail 158, thereby delivering fuel to the engine from the low-pressure fuel passage. Thus, a rate of change in the fuel passage pressure may be caused by heat transfer rate to the fuel system, $\dot{Q}$, and by fuel being pumped out of the fuel system. Under these conditions, a difference between an actual pressure drop, $\Delta P_{actual}$, measured by the fuel passage pressure sensor 145, and an expected pressure drop, $\Delta P_{inj}$, due to a volume of fuel injected, $V_{inj}$, may be used to determine a rate of change in pressure due to the heat transfer rate from the engine to the fuel system. $\Delta P_{inj}$ may be calculated according to equation (6), $$\Delta P_{inj}=K*V_{inj} \quad \text{Equation 6:}$$

$V_{inj}$ may be determined from a fuel flow rate intentionally leaving the fuel system volume, V, under consideration. In one example, V may correspond to the low-pressure fuel passage volume. In a PFI system, the fuel flow rate may be the injection fuel rate; in a DI system, the fuel flow rate leaving the low-pressure fuel passage may correspond to the DI pump fuel rate. Furthermore, the pressure drop due to heat transfer to the fuel system may be calculated from equation (7), $$\Delta P_{heat}=\Delta P_{inj}-\Delta P_{actual}=K*V_{inj}-\Delta P_{actual} \quad \text{Equation 7:}$$

According to equation (7) the change in pressure due to heat transfer may be calculated from the difference in the measured pressure drop, $\Delta P_{actual}$, and the decrease in fuel passage pressure due to fuel injection, $\Delta P_{inj}$. In this way, the influence of the injected fuel may be removed (e.g., calculated out), thereby isolating the contribution of heat transfer from the engine to the fuel passage on the change in fuel passage pressure. As such, the fuel temperature may be inferred from the rate of change in the fuel passage pressure arising from heat transferred to the fuel system. The measured (e.g., actual) pressure drop may be less than the expected pressure drop (decrease in pressure due to fuel injection) because of heat transferred to the fuel system that raises the fuel pressure when the low-pressure fuel pump is OFF. The actual pressure drop, $\Delta P_{actual}$, may be measured over a duration, $\Delta t$, when the lift pump is switched off. As such, $$\frac{\Delta P_{actual}}{\Delta t}$$

may correspond to a rate of change of the low passage fuel pressure. When $\Delta P_{actual}$ is larger in magnitude and or when $\Delta t$ is longer, the inferred fuel temperature may be more accurate and/or reliable since the influence of relative measurement errors may be reduced. In some examples, prior to measuring $\Delta P_{actual}$, the low-pressure fuel pump 130 may be switched on briefly to raise a fuel passage pressure to at least an upper threshold pressure, $P_{TH,upper}$. Raising the fuel passage pressure to $P_{TH,upper}$ may aid in ensuring that the fuel pressure and/or fuel volume in the low-pressure fuel passage 154 is higher so that a fuel temperature may be inferred with higher accuracy. Furthermore, after the low-pressure fuel pump is switched off, $\Delta P_{actual}$ may be determined from $P_{TH,upper}$ to a lower threshold pressure, $P_{TH,lower}$. Hence, the fuel temperature may be inferred from a rate of change in the fuel passage pressure, $$\frac{P_{TH,upper} - P_{TH,lower}}{\Delta t}.$$

In one example, $P_{TH,upper}$ may include 580 kPa, and $P_{TH,lower}$ may include 380 kPa.

Referring back to equation (7), a fuel volume change, $\Delta V_{heat}$, corresponding to the pressure drop due to heat transfer to the fuel system may be calculated using the stiffness, K, from equation (8), $$\Delta V_{heat} = \frac{\Delta P_{heat}}{K} = \frac{K * V_{inj} - \Delta P_{actual}}{K} \qquad \text{Equation 8}$$

Furthermore, a temperature change in the fuel resulting from the heat transferred to the fuel system from the engine may be determined according to equation (9), $$\Delta T_{heat} = \frac{\Delta V_{heat}}{V \alpha v} = \frac{K * V_{inj} - \Delta P_{actual}}{K V \alpha v}, \qquad \text{Equation 9}$$

where V is a volume of the low-pressure fuel passage, and $$\frac{\Delta V_{heat}}{V}$$

represents the tractional volume expansion of the fuel in the low-pressure fuel passage due to the heating. Then, the change in thermal energy, $\Delta E$, of the fuel in the low-pressure fuel passage can be calculated from equation (10):

$$\Delta E = \left(\frac{\Delta V_{heat}}{V}\right) V \rho s = \frac{(K * V_{inj} - \Delta P_{actual}) \rho s}{K \alpha v} \qquad \text{Equation 10}$$

Next, this change in thermal energy, $\Delta E$, corresponds to the amount of heat transferred from the engine to the fuel system. As a result, the heat transfer rate, $\dot{Q}$, may be determined from the rate of change in the fuel passage pressure, $$\frac{\Delta P_{actual}}{\Delta t},$$

according to equation (11), $$\dot{Q} = \frac{\Delta E}{\Delta t} = \qquad \text{Equation 11}$$

$$\frac{(\Delta P_{actual} - K * V_{inj}) \rho s}{\Delta t K \alpha v} = \left[\left(\frac{K * V_{inj}}{\Delta t}\right) - \left(\frac{\Delta P_{actual}}{\Delta t}\right)\right] \frac{\rho s}{K \alpha v}$$

Equation (1) may then be used to calculate the inferred fuel temperature from $\dot{Q}$ as calculated from equation (11). As such, during conditions when the DI pump 140 is on while the low-pressure fuel pump 130 is switched off, the fuel temperature may be inferred from the rate of change of the fuel passage pressure.

As an example, given $P_{TH,upper}$=580 kPa, $P_{TH,lower}$=380 kPa, a volume of fuel injected, $V_{inj}$=1.8 mL, a volume V of the low-pressure fuel passage is 100 mL, and the duration, $\Delta t$=2 s, the heat transfer rate, $\dot{Q}$, may be calculated from equation (11) as:

$$\dot{Q} = \left[\left(\frac{100 \frac{kPa}{mL} * 2.2 \text{ mL}}{2 \text{ s}}\right) - \left(\frac{200 \text{ kPa}}{2 \text{ s}}\right)\right] \frac{0.75 \frac{g}{mL} * 2.22 \text{ J/g } ^\circ \text{C.}}{100 \frac{kPa}{mL} 0.00095/^\circ \text{ C.}} = 175.3 \text{ W}$$

Then from equation (1), as in equation (4), $$T_{fuel} = T_{engine} - \frac{\dot{Q}}{C} = T_{engine} - \frac{175.3 \text{ W}}{5 \frac{W}{^\circ \text{C.}}} = T_{engine} - 35^\circ \text{ C.}$$

Thus, for an engine temperature of 90° C., the inferred fuel temperature would be 55° C. Referring back to FIG. 5, trend line 530 may thus correspond to a case where the fuel passage pressure is lowered due to fuel injection while heat is transferred to the fuel system from the engine.

During conditions where the fuel is being injected to the engine while the low-pressure fuel pump 130 is off, and the fuel system isothermal relative to the engine such that $T_{fuel} = T_{engine}$, $\dot{Q} = 0$, corresponding to no heat transfer from the engine to the fuel system, and thus the observed rate of change in the fuel passage pressure is higher (slope is more negative) as shown by trend line 540, relative to trend line 530 (non-isothermal engine and fuel system). In other words, when heat flows from the engine to the fuel system, the actual fuel passage stiffness indicated by the fuel passage pressure sensor 145 is slightly higher (slope of trend line in plot 500 is more positive) than the apparent fuel passage stiffness (the fuel passage stiffness during isothermal conditions). In one example, isothermal conditions may result when the vehicle has soaked for a long duration, no engine to fuel system heat transfer may occur because the engine and fuel system temperatures are equivalent (there temperatures have equilibrated).

In contrast, heat flow from the engine to the fuel system may be relatively higher when the engine is hotter and the fuel system is colder, such as soon after a cold start, when the engine temperature is much higher than the fuel temperature. Because the apparent stiffness (e.g., the rate of change in pressure of the fuel passage) is a relatively constant property of the fuel system, measuring the actual stiffness, which includes the influence of heat transfer to the fuel system on the rate of change of the fuel passage pressure, can aid in calculating the heat transfer rate. Furthermore, by measuring the fuel injection rate, a more reliable and accurate inference of the average fuel temperature in the fuel passage can be determined. Further still, knowing how the fuel temperature may vary in the low-pressure fuel passage 154 can aid in determining a fuel temperature distribution therein, based on the average fuel temperature. For example, a warmer portion of the fuel passage positioned closer to the DI pump may have a higher temperature while a colder portion of the fuel passage positioned further from the DI pump may have a lower temperature; the average fuel temperature may be equivalent to a volume average temperature of the warmer and colder portions of the fuel passage.

In other words, a pressure rise in the fuel passage may be due to heat transferred thereto from heat absorption over the length of the fuel passage. However, a portion of the fuel passage (including the fuel therein) in closer proximity to the fuel tank may generally have a lower temperature whereas a portion of the fuel passage in closer proximity to the engine may generally have a higher temperature (including the fuel therein). Accordingly, whereas an average fuel line temperature rise may be indicated from the measured fuel passage pressure rise, in reality, a majority of the temperature rise may be concentrated and associated with the portion of the fuel passage in closer proximity to the engine (where the temperature rise is higher). For the case of steady-state conditions, the average fuel temperature may remain sufficiently accurate; in another representation, for the case of unsteady-state conditions, the fuel passage may be divided into multiple subvolumes wherein the rate of pressure change across the fuel passage may be apportioned across each subvolume. In one example, a fuel passage may be divided into two subvolumes; a first subvolume at a colder temperature (nearer to a fuel tank temperature), and a second subvolume at a higher temperature (nearer to the underhood temperature). As such, during unsteady-state conditions, an initial fuel temperature of the second subvolume (positioned closer to the DI pump) may be higher; furthermore, heat transferred from the engine to the fuel passage may be higher in the second subvolume as compared to the first subvolume because of its closer proximity to the engine. In one example the second subvolume may include about 0.2 or 0.3 m of fuel line from the DI pump 140.

A more reliable and accurate estimate of the fuel system temperature may aid in operation of the engine and the fuel system. For example, a more reliable and accurate estimate of the fuel system temperature may help to more accurately determine the fuel vapor pressure, which can reduce a risk of fuel vapor formation in the fuel system and engine, thereby increasing engine performance and reducing fuel consumption. In another example, a more reliable and accurate estimate of the fuel system temperature may help to perform a check valve diagnostic more reliably, as illustrated in FIG. 6. A check valve diagnostic may be performed by measuring a low-pressure fuel passage compliance and/or stiffness. For example, responsive to switching off the low-pressure pump 130, the controller 170 may monitor the low-pressure fuel passage pressure to determine the fuel passage compliance and/or stiffness. Furthermore, the controller 170 may monitor the low-pressure fuel passage pressure to determine the fuel passage compliance and/or stiffness until the low-pressure fuel pump 13 is switched on.

As an example, if the measured stiffness is greater than a predetermined threshold stiffness, a leaky check valve may be indicated. For example, an apparent stiffness 620 measured by the controller 170 is much greater than the threshold stiffness 610, indicating a leaky check valve. The threshold stiffness 610 may be characteristic of the fuel system, and may depend on a heat flow rate transferred to the fuel system, as illustrated in FIG. 6. For example, at higher heat flows rates into the fuel system, a threshold stiffness 610 may be lower (arrow 614), while at lower heat flow rates transferred into the fuel system, the threshold stiffness 610 may be higher (arrow 612). Furthermore, higher heat flow transfer rates to the fuel system may arise from higher under hood temperatures such as by a higher cylinder head temperature, while lower heat transfer rates to the fuel system may arise from lower under hood temperatures. Thus, inferring a more reliable and accurate estimate of the heat flow transfer rates to the fuel system and resulting fuel temperature from the rate of change in the fuel passage pressure, as described herein, may aid in more accurately setting the threshold stiffness. In contrast, if the predetermined value for the threshold stiffness is inaccurate, the check valve diagnostic may misdiagnose the check valve as faulty when it is functioning or may misdiagnose the check valve as functioning when it is faulty and generating fuel vapor.

Turning now to FIG. 7, it illustrates a flow chart for a method 700 for inferring a fuel temperature based on a rate of change in the fuel passage pressure. Method 700 may represent computer readable instructions residing on-board non-transitory memory of a computing device and executable by the computing device in communication with various sensors and actuators of the engine 110 and the fuel system 150, such as the controller 170. Method 700 begins at 710 where controller 170 may estimate and/or measure various engine and fuel system operating conditions such as engine load, low-pressure pump on/off status, high-pressure (DI) pump on/off status, fuel injection flow rate, and the like. Method 700 may continue at 720 where the controller 170 determines if the fuel is being injected into the engine. Determining if fuel is being injected into the engine may include determining if a DI pump is ON. If fuel is being injected into the engine, method 700 may continue at 724 where the controller 170 switches the low-pressure fuel pump ON. Switching the low-pressure fuel pump on may aid in increasing a fuel passage pressure to a threshold upper pressure, $P_{TH,upper}$.

For the case where the fuel injection is OFF, method 700 may continue at 722 where the controller 170 may switch the low-pressure and high-pressure fuel pumps OFF so that fuel is trapped therebetween in the low-pressure fuel passage 154. Trapping fuel in the low-pressure fuel passage may allow for inferring the fuel temperature from measuring a rate of change in the fuel passage pressure, according to equations (1)-(5), as described above. Next at 730, the controller 170 may determine if a fuel passage pressure, $P_{fuelpassage}$ is greater than $P_{TH,upper}$. $P_{TH,upper}$ may correspond do a pressure above which a risk of the fuel passage pressure decreasing below the fuel vapor pressure, thereby generating fuel vapor in the fuel passage, is mitigated. In one example $P_{TH,upper}$ may include a pressure greater than 500 kPa, such as 580 kPa. In another example, $P_{TH,upper}$ may include a pressure below the fuel passage relief pressure, for example, the relief pressure corresponding to pressure relief valve 155. $P_{TH,upper}$ may depend on fuel temperature since the fuel vapor pressure also depends on vapor pressure. In this way $P_{TH,upper}$ may be higher at higher fuel temperatures and may be lower at lower fuel temperatures.

For the case where $P_{fuelpassage} < P_{TH,upper}$, method 700 may continue at 730. When $P_{fuelpassage} > P_{TH,upper}$, at 734 the controller 170 may switch the low-pressure fuel pump OFF. Switching off the low-pressure fuel pump allows the controller 170 to determine the rate of change in the fuel passage pressure due to heat transfer and due to fuel injection. In other words, the controller 170 may infer the fuel temperature from the rate of change in the fuel passage pressure as described above with reference to equations (1), and (6) through (11) above. Next, at 736, method 700 may include the controller 170 switching the high-pressure fuel pump ON to deliver fuel from the fuel passage into the fuel rail; in some examples, where fuel is already being injected into the engine the high-pressure fuel pump may already be switched ON. Following 736 or after 722 of method 700, the controller 170 may monitor fuel passage pressure, injection flow rate and elapsed time from when the low-pressure fuel pump is switched OFF at 734 or 722, respectively. The fuel passage pressure may be monitored with the fuel passage pressure sensor 145, the injection flow rate may be monitored from the operation of the DI pump, and the elapsed time may be measured by a counter residing in memory on-board the controller 170.

Next, method 700 may continue at 750 where the controller 170 determines if an infer fuel temperature condition is met. In one example, the infer fuel temperature condition may include a fuel passage pressure decreasing from at or above $P_{TH,upper}$ to below a lower threshold pressure, $P_{TH,lower}$. $P_{TH,lower}$ may correspond to a pressure below which a risk of generating fuel vapor in the low-pressure fuel passage 154 is increased. In another example, $P_{TH,lower}$ may correspond to a pressure far enough below $P_{TH,upper}$ that an accurate and reliably measure of a rate of change in the fuel passage pressure can be determined. In another example, the infer fuel temperature condition may be met after a threshold volume, $\Delta V_{TH}$, of fuel has been injected after the low-pressure fuel pump is switched off. $\Delta V_{TH}$ may represent a volume of fuel injected corresponding to accurately and reliably measuring of a rate of change in the fuel passage pressure can be determined, and may be determined based on operation of the DI pump 140. For example if the volume of fuel injected after the low-pressure fuel pump is switched off at 734 or 722 is less than $\Delta V_{TH}$, the rate of change in the fuel passage pressure may be smaller and measurement errors associated with determining the contributions to the rate of change in fuel passage pressure from heat transfer and fuel injection may be larger. In another example, the infer fuel temperature condition may be met after a threshold duration, $\Delta t_{TH}$, after the low-pressure fuel pump is switched off at 734 or 722 has passed. The threshold duration may correspond to a duration following the low-pressure fuel pump being switched at 734 or 722 after which the contributions to the rate of change in the fuel passage pressure from heat transfer and fuel injection may be accurately and reliably determined.

For the case where the infer fuel temperature condition is not met, the controller 170 may continue at 750. For the case where the infer fuel temperature condition is met at 750, method 700 may continue at 754, where the controller 170 calculates a rate of change in the fuel passage pressure. The rate of change in the fuel passage pressure may be determined from signals transmitted by fuel passage pressure sensor 145 positioned in the low-pressure fuel passage 154 between the low-pressure fuel pump 130 and the high-pressure fuel pump 140. Furthermore, the rate of change in the fuel passage pressure may be determined relative to an elapsed time, such as the threshold duration, or relative to a volume of fuel injected such as the threshold volume. In this way, at 756, the controller 170 may calculate an inferred fuel temperature based on equations (1) through (5) above when fuel injection is OFF and fuel is trapped in the low-pressure fuel passage 154, or based on equations (6) through (11) and equation (1), as described previously with reference to FIG. 5. In one example, calculating the inferred fuel temperature may include predetermining a stiffness characteristic of the fuel system, such as for the case when fuel is trapped in the low-pressure fuel passage.

Continuing to 760, method 700 may include the controller 170 adjusting fuel injection and/or operation of the low-pressure fuel pump responsive to the inferred fuel temperature at 756. Adjusting fuel injection flow to the engine may include adjusting operation of the low-pressure fuel pump. In one example, adjusting operation of the low-pressure fuel pump may include adjusting a diagnostic procedure for check valve 104, as described with reference to FIG. 6. In particular, an increase or decrease in the inferred fuel temperature may decrease or increase, respectively, a threshold stiffness or compliance characteristic to the fuel system, which may in turn influence the check valve diagnostic. For instance, when the measured fuel system stiffness is greater than the threshold stiffness, a faulty check valve may be indicated.

In another example, adjusting operation of the low-pressure fuel pump may include adjusting power supplied to the low pressure fuel pump to maintain a low-pressure pump outlet pressure greater than a threshold pump pressure. The threshold pump pressure may correspond to the fuel vapor pressure, which increases with increasing fuel temperature and decreases with decreasing fuel temperature. Accordingly, if an inferred fuel temperature increases or decreases, the threshold pump pressure may increase or decrease, respectively, thereby resulting in an increase or decrease to the power supplied to the low-pressure fuel pump for increasing or decreasing, respectively, the pump outlet pressure. When the inferred fuel temperature decreases, reducing the pump outlet pressure may aid in reducing fuel consumption while mitigating fuel vapor formation. When the low-pressure pump is operated in a pulsed mode, increasing power supplied to the low-pressure fuel pump may include increasing an amount of current supplied to the low-pressure fuel pump to increase a pulse height during the pulsed mode. Furthermore, adjusting the fuel injection rate to the engine responsive to a change in the inferred fuel temperature may include increasing power supplied to the low pressure fuel pump responsive to a decrease in the inferred fuel temperature to overcome an increase in pump friction and fuel viscosity. Conversely, adjusting the low pressure pump operation and fuel injection rate to the engine responsive to a change in the inferred fuel temperature may include decreasing power supplied to the low pressure fuel pump responsive to an increase in the inferred fuel temperature to compensate for a decrease in pump friction and fuel viscosity.

In another example, adjusting operation of the low-pressure fuel pump may include adjusting a threshold condition when switching operation of the low-pressure fuel pump from a pulsed mode to a continuous mode, as described with reference to FIG. 4. For example, when an inferred fuel temperature increases, a fuel vapor pressure may increase, thereby increasing a tendency for fuel vapor formation. As such, responsive to a higher inferred fuel temperature, when fuel vapor in the fuel passage is indicated and a low-pressure fuel pump is operating in pulsed mode to mitigate fuel vapor formation, the controller 170 may reduce the mitigating condition for transitioning to continuous mode operation to further reduce an amount of fuel vapor formed. In particular, the controller 170 may reduce a volume of fuel consumed, a time duration, and/or or a number of pulsation events during pulsed region 437, before switching operation of the LP pump from the pulsed energy region to the continuous energy region 439, as indicated at transition 438.

In another example, the controller 170 may adjust a lower and/or upper threshold low-pressure fuel pump pressure responsive to a change in the inferred fuel temperature. In one example, $P_{TH,lower}$ In particular, in the case where an inferred fuel temperature increases, $P_{TH,lower}$ and/or $P_{TH,upper}$ may be increased to reduce a risk of fuel vapor formation during execution of method 700 by the controller 170. Conversely, in the case where an inferred fuel temperature decreases, $P_{TH,lower}$ and/or $P_{TH,upper}$ may be decreased to reduce fuel consumption, while mitigating a risk of fuel vapor formation during execution of method 700 by the controller 170.

In another example, adjusting operation of the low-pressure fuel pump may include the controller 170 adjusting a trough pressure, the trough pressure corresponding to a low threshold pressure above which the low-pressure fuel pump is operated to reduce a risk of fuel vaporization in the fuel system. For example, in response to an increase in the inferred fuel temperature, the controller 170 may increase the trough pressure to maintain the trough pressure above a fuel vapor pressure. Furthermore, in response to a decrease in the inferred fuel temperature, the controller 170 may decrease the trough pressure to reduce fuel consumption while maintaining the trough pressure above a fuel vapor pressure. After 760, method 700 ends.

In one example, a method for an engine includes adjusting operation of a low-pressure fuel pump based on a fuel temperature indicated from a rate of change in a pressure of a fuel passage between the low-pressure fuel pump and a high-pressure fuel pump during a first condition, including when the low pressure fuel pump is switched off. In a first example of the method, indicating the fuel temperature from the rate of change in the fuel passage pressure includes inferring the fuel temperature without measuring a fuel system temperature with a temperature sensor. A second example of the method optionally includes the first example and further includes wherein the first condition further includes when the high pressure fuel pump is switched off. A third example of the method optionally includes one or more of the first and second examples and further includes wherein the first condition further includes when the engine is operating in a decel-fuel-shut-off (DFSO) mode. A fourth example of the method optionally includes one or more of the first through third examples and further includes wherein the first condition further includes when the high pressure fuel pump is switched on and the fuel passage pressure is between an upper threshold pressure and a lower threshold pressure. A fifth example of the method optionally includes one or more of the first through fourth examples and further includes switching on the low pressure fuel pump to raise the fuel passage pressure to the upper threshold pressure. A sixth example of the method optionally includes one or more of the first through fifth examples and further includes in response to the fuel passage pressure reaching the upper threshold pressure, switching off the low pressure fuel pump and pumping a threshold volume of fuel from the fuel passage with the high pressure fuel pump. A seventh example of the method optionally includes one or more of the first through sixth examples and further includes in response to the fuel passage pressure reaching the upper threshold pressure, switching off the low pressure fuel pump and pumping fuel from the fuel passage with the high pressure fuel pump for a threshold duration. A eighth example of the method optionally includes one or more of the first through seventh examples and further includes in response to the fuel passage pressure reaching the upper threshold pressure, switching off the low pressure fuel pump and pumping fuel from the fuel passage with the high pressure fuel pump until the fuel passage pressure decreases to a lower threshold pressure.

A method for an engine includes determining a rate of change of pressure in a fuel passage pressure responsive to a high pressure fuel pump injecting a threshold volume of fuel to the engine while a low pressure fuel pump is off, the fuel passage coupled between the low pressure fuel pump and the high pressure fuel pump, inferring a fuel temperature from the rate of change in the fuel passage pressure, and adjusting a fuel injection rate to the engine responsive to a change in the inferred fuel temperature. A first example of the method optionally includes determining the rate of change in the fuel passage pressure responsive to trapping fuel in the fuel passage. A second example of the method optionally includes the first example and further includes wherein adjusting the fuel injection rate to the engine responsive to a change in the inferred fuel temperature includes increasing a LPFP pressure in response to a higher inferred fuel temperature, and lowering the LPFP pressure in response to a lower inferred fuel temperature. A third example of the method optionally includes one or more of the first and second examples, and further includes wherein trapping fuel in the fuel passage includes switching off the LPFP and the HPFP simultaneously. A fourth example of the method optionally includes one or more of the first through third examples and optionally includes wherein adjusting the fuel injection rate to the engine responsive to a change in the inferred fuel temperature includes increasing power supplied to the low pressure fuel pump responsive to a decrease in the inferred fuel temperature.

Turning now to FIG. 8, it illustrates an example timeline 800 for a method 700 of inferring a fuel temperature. Trend lines are shown for fuel injection flow rate, $Q_{inj}$ 810, low-pressure fuel pump (LPFP) status 820, high-pressure fuel pump (HPFP) status 830, fuel passage pressure, $P_{fuelpassage}$ 840, an infer fuel temperature condition status 850, the inferred fuel temperature, $T_{fuel,inf}$ 860, the engine temperature, $T_{engine}$ 862, and a threshold stiffness, $K_{TH}$ 870. Also shown are $P_{TH,upper}$ 846 and $P_{TH,lower}$ 844. Prior to time t1, fuel is being injected into the engine, as indicated by a non-zero value for $Q_{inj}$ 810. Furthermore, both the LPFP and the HPFP are switched ON to provide a steady supply of fuel for the engine; however both the LPFP and the HPFP may be operated in a pulsed mode to mitigate fuel vaporization and to reduce fuel consumption relative to operating the fuel pumps in a continuous mode. Because fuel is being pumped out of the fuel passage by the HPFP pulsed mode operation and fuel is being pumped into the fuel passage by the LPFP in pulsed mode operation, $P_{fuelpassage}$ 840 pulses prior to time t1.

At time t1, $Q_{inj}$ 810 is turned OFF (e.g., 0), for example, in response to a vehicle operating in DFSO mode. As another example, $Q_{inj}$ 810 may be OFF for operation of a hybrid vehicle being propelled by the electric motor and not by the combustion engine. Because the fuel injection flow rate is zero both the low pressure fuel pump and the high pressure fuel pump are switched OFF, thereby trapping fuel in the low-pressure fuel passage therebetween. Also at time t1, the controller 170 beings executing method 700 to infer the fuel temperature in the fuel passage. $T_{engine}$ 862 is greater than the fuel system temperature, so the fuel passage pressure begins to increase due to heat transferred to the fuel system from the engine because the fuel is trapped in the fuel passage with the LPFP (and HPFP) off. The fuel passage pressure is measured with the fuel passage pressure sensor 145 is monitored for a duration 842. The duration 842 may correspond to a threshold duration beyond which an accuracy and reliability of the rate of change in the fuel passage pressure (and resultant inferred fuel temperature) may be increased. In another example, the controller 170 may monitor the fuel passage pressure until a threshold pressure change 843 is observed. The threshold pressure change 843 may correspond to a rise in pressure beyond which an accuracy and of the rate of change in the fuel passage pressure (and resultant inferred fuel temperature) may be increased.

At time t2, the infer fuel temperature condition 850 is met (e.g., the pressure change is greater than the threshold pressure change 843 and/or the time elapsed is greater than the threshold duration 842) and the controller 170 calculates the rate of change in the fuel passage pressure from the measured fuel passage pressure rise 843 and the measured duration 842. Next, the controller 170 may infer the fuel temperature, $T_{fuel,inf}$ utilizing equations (1) through (5). $T_{fuel,inf}$ increases at time t2 since $T_{engine}$ 862 is greater than the fuel system temperature and heat is transferred from the engine to the fuel system. Because of the increase in the inferred fuel system temperature, the threshold stiffness 870 characteristic of the fuel passage is reduced, which can adjust determination of a check valve diagnostic as described above. Furthermore, responsive to the increase in $T_{fuel,inf}$ 860, the controller 170 may increase $P_{TH,upper}$ 846 and $P_{TH,lower}$ 844, as shown in FIG. 8.

Between time t2 and time t3, the LPFP and the HPFP remain OFF and $Q_{inj}$ remains 0. Thus, $P_{fuelpassage}$ continues to rise until time t3, however because the inferred fuel temperature condition is not met, the controller 170 may not recalculate the inferred fuel temperature. At time t3, fuel injection is switched ON; as such $Q_{inj}$ is increased, and the LPFP and HPFP are both switched ON, and operated in pulse mode to supply the fuel to the injection at the fuel injection flow rate, $Q_{inj}$. Furthermore, $P_{fuelpassage}$ pulses responsive to the pulsed operation of the LPFP and the HPFP. At time t4, the controller 170 operates the LPFP to increase $P_{fuelpassage}$ to $P_{TH,upper}$ in order to infer the fuel temperature during fuel injection to the engine. In the example of FIG. 8, the controller 170, at time t4, transitions the LPFP to continuous mode to aid in increasing $P_{fuelpassage}$ to $P_{TH,upper}$. In another example, the controller 170 may maintain the LPFP in pulsed mode, but may supply additional current to the LPFP to increase the pulse amplitude and/or duration, thereby supplying a higher volumetric flow rate of fuel to the fuel passage to increase $P_{fuelpassage}$. At time t5, $P_{fuelpassage}$ reaches $P_{TH,upper}$; in response, the controller 170 switches OFF the LPFP, and the controller 170 monitors $P_{fuelpassage}$, the elapsed time, and/or a volume of fuel injected thereafter to determine if an infer fuel temperature condition has been met. The infer fuel temperature condition during fuel injection conditions may be different than the infer fuel temperature conditions when fuel injection is off (e.g., when both LPFP and HPFP are switched OFF and fuel is trapped therebetween) because the rate of change in $P_{fuelpassage}$ may be higher during fuel injection conditions. As such, the infer fuel temperature conditions such as the threshold duration 848, a threshold pressure drop (e.g., pressure drop between $P_{TH,upper}$ and $P_{TH,lower}$), and/or a threshold volume of fuel injected (e.g., integral area 812) may be different than the respective infer fuel temperature conditions when fuel injection is OFF. In the example of FIG. 8, at time t6, responsive to $P_{fuelpassage}$ decreasing to $P_{TH,lower}$ from $P_{TH,upper}$, the infer fuel condition is met and the controller 170 calculates an updated inferred fuel temperature. Here, during fuel injection conditions, the controller 170 infers the fuel temperature based on equations (6) through (11) and equation (1), as discussed above. Owing to the fuel injection flow rate and the reduced heat transfer from the engine to the fuel system (e.g., since the temperature difference between $T_{enging}$ and $T_{fuel}$ is smaller), the inferred fuel temperature slightly decreases at time t6. Responsive to $T_{fuel,inf}$ decreasing at time t6, the threshold stiffness increases slightly, and $P_{TH,upper}$ and $P_{TH,lower}$ decrease slightly.

Next, at time t6, the LPFP is switched ON to supply fuel to the fuel passage and both the LPFP and HPFP are operated in pulse mode; between time t6 and time t7, $P_{fuelpassage}$ pulses responsively to the pulsed action of the LPFP and HPFP. At time t7, the engine is switched OFF, thereby switching OFF the fuel injection, the LPFP, and HPFP. In one example, the engine may be switched OFF in a hybrid vehicle, whereby propulsion is driven solely by an electric motor. Because fuel is trapped in the low-pressure fuel passage, heat transfer from the engine to the fuel system gradually pressurizes the fuel system, increasing $P_{fuelpassage}$ from time t7 to time t8. Because the engine is OFF, combustion ceases; however, because the vehicle is still in motion, the engine continues to be cooled by airflow and $T_{engine}$ 862 begins to decrease gradually. At time t8, after a threshold duration 842 has elapsed after the LPFP is switched OFF, an infer fuel temperature condition is met and the controller 170 infers the fuel temperature based on equations (1) through (5). At time t8, $T_{fuel,inf}$ 860 increases and is approximately equal to $T_{engine}$ 862. Responsive to the increase in $T_{fuel,inf}$, $P_{TH,upper}$ and $P_{TH,lower}$ increase and $K_{TH}$ 870 decreases. After time t8, further heat transfer between the engine and the fuel system stops because $T_{fuel,inf}$ 860 is equal to $T_{engine}$ 862, the engine is isothermal relative to the fuel passage. Thus, after time t8, $P_{fuelpassage}$ is relatively constant.

Turning now to FIG. 9, it illustrates a flow chart for a method 900 for inferring a fuel temperature based on a rate of change in the fuel passage pressure. Method 900 may represent computer readable instructions residing on-board non-transitory memory of a computing device and executable by the computing device in communication with various sensors and actuators of the engine 110 and the fuel system 150, such as the controller 170. Method 900 begins at 910 where controller 170 may estimate and/or measure various engine and fuel system operating conditions such as engine load, low-pressure pump on/off status, high-pressure (DI) pump on/off status, fuel injection flow rate, and the like. Next, at 920, the controller 170 may determine if the low-pressure fuel pump is OFF. For the case where fuel injection is ON, the controller 170 may maintain a previously inferred fuel temperature at 924 as the current fuel temperature estimate and may maintain the trough pressure, after which method 900 ends. Maintaining the previously inferred fuel temperature may allow the controller 170 to continue operating the fuel system, while mitigating a risk of fuel vapor formation. Furthermore maintaining the trough pressure may reduce fuel consumption while reducing a risk of fuel vaporization, for example, fuel vaporization at the inlet to the DI pump.

Returning to 920, in the case where the low-pressure fuel pump is OFF, method 900 continues at 930 where the controller 170 determines a measured fuel system stiffness. As described above, the controller 170 may determine the measured fuel system stiffness by measuring a fuel flow rate out of the low-pressure fuel passage corresponding to a measured pressure drop, $\Delta P_{actual}$, for example when a fuel passage pressure decreases from $P_{TH,upper}$ to $P_{TH,lower}$. Owing to the heat being transferred from the engine to the fuel system, the measure fuel system stiffness is unequal to the apparent fuel system stiffness as discussed above with reference to FIG. 5. At 950, method 900 the controller 170 may compute the heat transfer rate, $\dot{Q}$, to the low-pressure fuel passage 154 from the engine 110 from the difference between the measured fuel system stiffness and the apparent fuel system stiffness. In particular, according to equation (11), $\dot{Q}$ may be determined knowing the measured pressure drop, $\Delta P_{actual}$, apparent stiffness, K, and the volume of fuel injected $V_{inj}$ over a duration $\Delta t$. $V_{inj}$ and $\Delta t$ may be determined concurrently with measuring the fuel flow rate. Following 940, method 900 may continue at 950, where the controller 170 may infer the fuel temperature, given the measured stiffness at 930 and the computed heat transfer rate at 940, according to equation (1). For the case where fuel injection is OFF, equation (11) simplifies to equation (2) (which follows from equation (1)), from which the fuel system temperature may be inferred.

Next, method 900 may continue at 960 where the controller may adjust a low-pressure fuel pump trough pressure in response to a change in the inferred fuel system temperature. The inferred fuel system temperature may include a low-pressure fuel passage fuel temperature. In one example, the inferred fuel system temperature may correspond to a DI inlet fuel temperature. The trough pressure may correspond to a low threshold pressure above which fuel vaporization in the fuel system is mitigated. Adjusting the trough pressure responsive to the change in the inferred fuel temperature may include raising the trough pressure in response to an increase in fuel temperature (or inferred fuel temperature), to reduce a risk of fuel vaporization. As another example, adjusting the trough pressure responsive to the change in the inferred fuel temperature may include lowering the trough pressure in response to a decrease in fuel temperature (or inferred fuel temperature), to reduce fuel consumption while mitigating a risk of fuel vaporization. Furthermore, the controller 170 may implement a larger magnitude adjustment to the trough pressure when the change in the inferred fuel temperature is larger, and, the controller 170 may implement a smaller magnitude adjustment to the trough pressure when the change in the inferred fuel temperature is smaller. After 960, method 900 ends.

Turning now to FIG. 10, it illustrates a timeline 1000 for a method 900 of inferring a fuel temperature. In one example, the inferred fuel temperature, $T_{fuel,inf}$ may correspond to a fuel temperature in a low-pressure fuel passage 156. Trend lines are shown for fuel injection flow rate, $Q_{inj}$ 1010, low-pressure fuel pump (LPFP) status 1020, measured fuel system stiffness, $\Delta P_{actual}/\Delta V$ 1030, heat transfer rate into the fuel system, $\dot{Q}$ 1040, engine temperatures $T_{engine}$ 1050, the inferred fuel temperature, $T_{fuel,inf}$ 1060, and a trough pressure, $P_{trough}$ 1060. At time 0, a vehicle engine is started and idled following a long engine OFF duration, during which the vehicle underwent a long soak, whereby the vehicle is isothermal. As such, during the short duration between time 0 and time $t_1$, $T_{engine}=T_{fuel}$ (the actual fuel system temperature), and $\dot{Q}=0$. Prior to time $t_1$, $Q_{inj}$ and the LPFP are switched ON briefly to start the engine. At time $t_1$, $Q_{inj}$ and the LPFP are switched OFF since the vehicle is idle. In response to switching OFF the LPFP, the controller 170 determines a fuel system stiffness, by measuring $\Delta P_{actual}$ by way of the fuel passage pressure sensor 145. Since the vehicle is isothermal and there is no heat transferred to the fuel system, in the absence of fuel injection, the fuel passage pressure is constant; hence, the measured fuel system stiffness is 0. Accordingly, the $T_{fuel,inf}$ does not change, and the controller 170 maintains $P_{trough}$.

Between time $t_1$ and time $t_2$, the engine begins to warm and $T_{engine}$ rises. At time $t_2$, in response to the LPFP being OFF, the controller 170 executes method 900 to infer the fuel system temperature. Because $T_{engine}$ is higher than the fuel system temperature, heat is transferred from the engine to the fuel system, as indicated by $\dot{Q}>0$. $\dot{Q}$ becomes larger as the temperature difference between the engine and the fuel system rises. Accordingly a measured stiffness of the fuel system is positive at time $t_2$ since the fuel in the fuel system is being heated. Thus, the value $T_{fuel,inf}$ calculated by the controller 170 increases at time $t_2$.

Between time $t_2$ and time $t_3$, $T_{engine}$ begins increases more slowly such that the heat transfer rate from the engine to the fuel system begins decreasing. Furthermore, the LPFP may be pulsed ON for a short period to replenish fuel in the low-pressure fuel passage. In one example, the LPFP is switched ON to raise the fuel passage pressure to $P_{TH,upper}$, to mitigate a risk of fuel vaporization during operation of the fuel system. At time $t_3$, the vehicle is no longer idle, and fuel injection is switched ON to deliver fuel to the engine. In response to the LPFP being OFF, the controller 170 again executes method 900 to determine $T_{fuel,inf}$. The controller 170 measures the stiffness of the fuel system from the fuel passage pressure sensor 145 and from the fuel injection flow rate. Despite heat transfer from the engine to the fuel system, the measured stiffness becomes negative at time $t_3$ owing to the outflow of fuel from the low-pressure fuel passage. By accounting for the pressure drop from the outflow of fuel according to equation (7), the controller 170 may determine the contribution to the pressure drop from the heat transfer alone, as shown in equations (8) through (11). Furthermore, utilizing equation (1), the controller 170 may calculate the updated $T_{fuel,inf}$. $T_{fuel,inf}$ increases at time $t_3$ because of the heat transferred to the fuel system between time $t_2$ and time $t_3$. In response to the increase in $T_{fuel,inf}$ at time $t_3$, the controller 170 raises $P_{trough}$.

Next, between time $t_3$ and time $t_4$, the heat transfer rate from the engine to the fuel system continues to decrease since the temperature difference therebetween is smaller. The LPFP is again switched ON briefly in order to deliver fuel to the low-pressure fuel passage. In one example, the LPFP may be switched ON to raise the fuel passage pressure to $P_{TH,upper}$, to mitigate a risk of fuel vaporization during operation of the fuel system. At time $t_4$, the fuel injection flow rate may be switched OFF, for example, in response to a DFSO condition. Responsive to the LPFP being OFF, the controller 170 may again infer the fuel temperature according to method 900 at time $t_4$. Since $T_{engine}$ remains greater than the fuel system temperature, heat is transferred to the fuel system, albeit at a smaller rate. Furthermore, because the fuel injection flow rate is 0, the measured fuel system stiffness becomes positive; the fuel is trapped in the fuel passage and the fuel passage pressure increases because of the heat transferred to the fuel system. Because $\dot{Q}$ is lower at time $t_4$ as compared to $\dot{Q}$ at time $t_2$, the measured fuel system stiffness is slightly lower at time $t_4$ as compared to the measured fuel system stiffness at time $t_2$. Thus the controller 170 calculates an increased $T_{fuel,inf}$ at time $t_4$. In response to the increase in $T_{fuel,inf}$ at time $t_4$, the controller 170 raises $P_{trough}$. In this way, the controller 170 may accurately and reliably infer a fuel system temperature from a measured rate of change in a fuel passage pressure.

In another representation, an inferred fuel system temperature may correspond to a fuel temperature in the fuel rail 158. In this case, during a condition when the DI pump 140 is OFF (fuel injection is OFF) so that fuel is trapped in the fuel rail 158, the controller 170 may measure a $\Delta P_{actual}$ corresponding to a fuel rail pressure drop by way of the fuel rail pressure sensor 162. Knowing the volume, V, of the fuel rail 158, the heat transfer rate from the engine to the fuel rail may be computed, following equations (1) through (5) analogously as described above for the low-pressure fuel passage. Here, the value of C, the empirical constant representing the heat capacity rate (W/° C.) of the fuel system, may correspond to a predetermined heat capacity rate of the fuel rail 158. Accordingly, equations (1) through (5) may be followed for inferring a fuel rail fuel temperature analogously to the methods for inferring a fuel temperature in the low-pressure fuel passage.

In one example, an engine system is provided, comprising a controller with computer readable instructions stored on non-transitory memory that when executed cause the controller to, measure a rate of change in a fuel passage pressure with a pressure sensor during a first condition, including when a low-pressure fuel pump (LPFP) is switched off, infer a fuel temperature from the rate of change in the fuel passage pressure, and adjust operation of the LPFP responsive to a change in the inferred fuel temperature. The engine system may additionally or alternatively include a temperature sensor, wherein the computer readable instructions causing the controller to infer the fuel temperature include measuring a cylinder head temperature with the temperature sensor. In any of the preceding embodiments the engine system may additionally or alternatively include the LPFP. Furthermore, the computer readable instructions causing the controller to adjust operation of the LPFP responsive to a change in the inferred fuel temperature may additionally or alternatively include raising a lower threshold LPFP pressure responsive to a higher inferred fuel temperature and lowering the lower threshold LPFP pressure responsive to a lower inferred fuel temperature. In any of the preceding embodiments, the computable the computer readable instructions causing the controller to adjust operation of the LPFP responsive to a change in the inferred fuel temperature may additionally or alternatively include reducing a threshold fuel volume pumped during pulsing of the LPFP above the lower threshold LPFP pressure prior to switching operation of the LPFP from the pulsed mode to the continuous mode. In any of the preceding embodiments, the engine system may additionally or alternatively include the pressure sensor and a high-pressure fuel pump (HPFP), wherein the pressure sensor is positioned in the fuel passage between the LPFP and the HPFP. In any of the preceding embodiments, the engine system may additionally or alternatively include the pressure sensor and a high-pressure fuel pump (HPFP), wherein the pressure sensor is positioned in a fuel rail downstream from the HPFP and the inferred fuel temperature corresponds to an inferred fuel rail temperature. In another representation, the engine system may additionally or alternatively include a check valve positioned downstream from the LPFP in the fuel passage. Furthermore, in any of the preceding embodiments including the check valve, the computer readable instructions causing the controller to adjust operation of the LPFP responsive to a change in the inferred fuel temperature may additionally or alternatively include, while the LPFP is switched off, indicating a faulty check valve when a pressure drop measured by the pressure sensor corresponding to a threshold volume of fuel pumped from the fuel passage is greater than a threshold pressure drop, and raising the threshold pressure drop in response to a lower inferred fuel temperature.

In another representation, the method for a hybrid vehicle may comprise measuring a rate of change in a pressure of a fuel passage between a low pressure fuel pump and a high pressure fuel pump during a first condition, inferring a fuel temperature based on the rate of change in the fuel passage pressure and adjusting operation of the low pressure fuel pump based on the inferred fuel temperature. The first condition may include when the low pressure pump is switched off and when an engine is switched off. The first condition may further include when an engine temperature is non-isothermal with the fuel system temperature.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   adjusting operation of a low-pressure fuel pump based on a fuel temperature indicated from a rate of change in a pressure of a fuel passage between the low-pressure fuel pump and a high-pressure fuel pump during a first condition, including when the low pressure fuel pump is switched off.

2. The method of claim 1, wherein indicating the fuel temperature from the rate of change in the fuel passage pressure includes inferring the fuel temperature without measuring a fuel system temperature with a temperature sensor.

3. The method of claim 2, wherein the first condition further includes when the high pressure fuel pump is switched off.

4. The method of claim 3, wherein the first condition further includes when the engine is operating in a decel-fuel-shut-off (DFSO) mode.

5. The method of claim 2, wherein the first condition further includes when the high pressure fuel pump is switched on and the fuel passage pressure is between an upper threshold pressure and a lower threshold pressure.

6. The method of claim 5, further comprising, switching on the low pressure fuel pump to raise the fuel passage pressure to the upper threshold pressure.

7. The method of claim 6, further comprising, in response to the fuel passage pressure reaching the upper threshold pressure, switching off the low pressure fuel pump and pumping a threshold volume of fuel from the fuel passage with the high pressure fuel pump.

8. The method of claim 6, further comprising, in response to the fuel passage pressure reaching the upper threshold pressure, switching off the low pressure fuel pump and pumping fuel from the fuel passage with the high pressure fuel pump for a threshold duration.

9. The method of claim 6, further comprising, in response to the fuel passage pressure reaching the upper threshold pressure, switching off the low pressure fuel pump and pumping fuel from the fuel passage with the high pressure fuel pump until the fuel passage pressure decreases to a lower threshold pressure.

10. An engine system, comprising:
    a controller with computer readable instructions stored on non-transitory memory that when executed cause the controller to,
    measure a rate of change in a fuel passage pressure with a pressure sensor during a first condition, including when a low-pressure fuel pump (LPFP) is switched off,
    infer a fuel temperature from the rate of change in the fuel passage pressure, and
    adjust operation of the LPFP responsive to a change in the inferred fuel temperature.

11. The engine system of claim 10, further comprising a temperature sensor, wherein the computer readable instructions causing the controller to infer the fuel temperature include measuring a cylinder head temperature with the temperature sensor.

12. The engine system of claim 10, further comprising the LPFP, wherein the computer readable instructions causing the controller to adjust operation of the LPFP responsive to a change in the inferred fuel temperature include raising a lower threshold LPFP pressure responsive to a higher inferred fuel temperature and lowering the lower threshold LPFP pressure responsive to a lower inferred fuel temperature.

13. The engine system of claim 12, wherein the computer readable instructions causing the controller to adjust operation of the LPFP responsive to a change in the inferred fuel temperature include reducing a threshold fuel volume pumped during pulsing of the LPFP above the lower threshold LPFP pressure prior to switching operation of the LPFP from the pulsed mode to the continuous mode.

14. The engine system of claim 13, further comprising the pressure sensor and a high-pressure fuel pump (HPFP), wherein the pressure sensor is positioned in the fuel passage between the LPFP and the HPFP.

15. The engine system of claim 13, further comprising the pressure sensor and a high-pressure fuel pump (HPFP), wherein the pressure sensor is positioned in a fuel rail downstream from the HPFP and the inferred fuel temperature corresponds to an inferred fuel rail temperature.

16. A method for an engine, comprising:
    determining a rate of change of pressure in a fuel passage pressure responsive to a high pressure fuel pump injecting a threshold volume of fuel to the engine while a low pressure fuel pump (LPFP) is off,
    inferring a fuel temperature from the rate of change in the fuel passage pressure, and
    adjusting a fuel injection rate to the engine responsive to a change in the inferred fuel temperature.

17. The method of claim 16, further comprising, determining the rate of change in the fuel passage pressure responsive to trapping fuel in the fuel passage.

18. The method of claim 17, wherein adjusting the fuel injection rate to the engine responsive to a change in the inferred fuel temperature includes increasing a LPFP pressure in response to a higher inferred fuel temperature, and lowering the LPFP pressure in response to a lower inferred fuel temperature.

19. The method of claim 18, wherein trapping fuel in the fuel passage includes switching off the LPFP and the HPFP simultaneously.

20. The method of claim 19, wherein adjusting the fuel injection rate to the engine responsive to a change in the inferred fuel temperature includes increasing power supplied to the low pressure fuel pump responsive to a decrease in the inferred fuel temperature.

* * * * *